(12) United States Patent
Chen et al.

(10) Patent No.: US 12,182,420 B2
(45) Date of Patent: *Dec. 31, 2024

(54) DATA RESYCHRONIZATION METHODS AND SYSTEMS IN CONTINUOUS DATA PROTECTION

(71) Applicant: Rubrik, Inc., Palo Alto, CA (US)

(72) Inventors: Shaomin Chen, San Jose, CA (US); Li Ding, Cupertino, CA (US); Kushaagra Goyal, Cupertino, CA (US); Abhay Mitra, Santa Clara, CA (US); Kunal Sean Munshani, Fremont, CA (US); Shaswat Chaubey, Mountain View, CA (US); Benjamin Travis Meadowcroft, Lincoln, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,906

(22) Filed: Jul. 24, 2023

(65) Prior Publication Data

US 2023/0376219 A1    Nov. 23, 2023

Related U.S. Application Data

(63) Continuation of application No. 17/569,699, filed on Jan. 6, 2022, now Pat. No. 11,747,995, which is a continuation of application No. 17/114,130, filed on Dec. 7, 2020, now Pat. No. 11,249,655.

(51) Int. Cl.
*G06F 12/00* (2006.01)
*G06F 3/06* (2006.01)
*G06F 11/14* (2006.01)
*G06F 9/455* (2018.01)

(52) U.S. Cl.
CPC ............ *G06F 3/0619* (2013.01); *G06F 3/065* (2013.01); *G06F 3/0673* (2013.01); *G06F 11/1464* (2013.01); *G06F 9/45558* (2013.01); *G06F 2009/45579* (2013.01); *G06F 2009/45583* (2013.01); *G06F 2009/45587* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 10,133,874 B1 * | 11/2018 | Natanzon | G06F 21/6218 |
| 11,249,655 B1 | 2/2022 | Chen et al. | |
| 11,747,995 B2 * | 9/2023 | Chen | G06F 3/0619 |
| | | | 711/6 |
| 2005/0050386 A1 | 3/2005 | Reinhardt et al. | |
| 2006/0013208 A1 | 1/2006 | Rietschel et al. | |
| 2020/0341861 A1 | 10/2020 | Ling et al. | |
| 2021/0133038 A1 | 5/2021 | Ling et al. | |

* cited by examiner

*Primary Examiner* — Daniel D Tsui
(74) *Attorney, Agent, or Firm* — Holland & Hart LLP

(57) ABSTRACT

Example embodiments relate generally to data resynchronization methods and systems in continuous data protection (CDP) and more specifically to an input and output (I/O) filtering framework and log management system to seek a near-zero recovery point objective (RPO).

20 Claims, 35 Drawing Sheets

DATA RESYNCHRONIZATION METHODS AND SYSTEMS IN CONTINUOUS DATA PROTECTION

CLAIM OF PRIORITY

This application is a Continuation of U.S. application Ser. No. 17/569,699, filed Jan. 6, 2022, which is a Continuation of U.S. application Ser. No. 17/114,130, filed Dec. 7, 2020, each of which is hereby incorporated by reference in its entirety.

FIELD

The present disclosure relates generally to methods and systems for data resynchronization in continuous data protection (CDP) and more specifically to an input and output (I/O) filtering framework and log management system to seek a near-zero recovery point objective (RPO).

BACKGROUND

Virtual machines (VM's) that include virtual disks are sometimes backed up by taking snapshots. Due to certain limitations of existing snapshot technology, snapshots cannot be taken frequently without impacting VM users. Typical snapshot-based backup and recovery technology provides RPOs in the tens of minutes.

In a snapshot-based approach, a base snapshot is taken when a protection policy under a service level agreement (SLA) for example is enabled on a VM and its virtual disks. After the base snapshot is saved on a backup site, incremental snapshots are taken periodically. A delta between two snapshots represents data blocks that have changed, and these blocks may be sent to and stored on a backup site for recovery when needed. Since taking snapshots is an expensive operation and may impact users, snapshots are typically taken some minutes apart, often from the tens of minutes to several hours, and this in turn can result in a very poor RPO.

As a real-time streaming backup system, a potential issue with some CDP systems is that they may become incapable of catching up with I/O streams from a data source, for example a virtual disk. This situation is known as being "out of sync".

SUMMARY

In some general examples, virtual disk I/Os are intercepted in an I/O path thereby allowing the I/O to be replicated to a backup site at near real time with minimal user impacts, substantially eliminating the need to take snapshots periodically. RPO may be reduced down to seconds. In some examples, a log management system oversees and controls a log stream received at the backup site.

Some examples include further technology, colloquially referred to as "CDP resync", to allow a recovery or resumption of CDP after interruption without requiring a snapshot. Some examples endow CDP systems with greater resiliency to recover a virtual machine (VM) from out of sync state with as little downtime as possible.

In some examples, a central feature of CDP resync is the ability to avoid the need to take a new snapshot by quickly syncing up the entire persistence state of the source VM. The state of the VM is rapidly transferred over a high speed network from one physical server to another. Resync only replicates the persistence state of the VM. In some examples, other states such as active memory, network state and precise execution state are not relevant to CDP. In some examples, the resync process is independent between different disks. In some examples, it may be the case that a given disk is in a "resync" state, while other disks of the same VM are still in normal "sync" state.

In some examples, a system is provided for data resynchronization in continuous data protection of a virtual machine (VM) having a virtual disk. An example system comprises at least one processor for executing machine-readable instructions; and a memory storing instructions configured to cause the at least one processor to perform operations comprising, at least: obtaining a base snapshot of the virtual disk; intercepting, at an interception point in an I/O path, a virtual disk I/O stream between the VM and a virtualization server; replicating the I/O stream at a backup site; in a synchronization mode, storing the replicated I/O stream at the backup site in I/O logs; forming a recoverable snapshot-log chain by applying the replicated I/O stream stored in the I/O logs on top of the base snapshot; based on an interruption or discontinuity in the I/O stream, in a resynchronization mode: maintaining a bitmap, marking dirty blocks in the bitmap, and sending corresponding dirty block data to a log receiver service to resynchronize a virtual disk state at the log receiver service; receiving a request for recoverable data from a replication target; and sending data to the replication target based at least on a portion of the recoverable snapshot-log chain.

In some examples, the operations further comprise establishing a filter framework at the interception point, the filter framework including an I/O stack and an I/O filter.

In some examples, the I/O filter maintains at least two bitmap buffers for tracking the dirty blocks.

In some examples, the at least two bitmap buffers include an active buffer and a passive buffer.

In some examples, the active buffer reads and sends the dirty block data to the log receiver service.

In some examples, the passive buffer tracks the dirty blocks.

In some examples, the active buffer and the passive buffer simultaneously switch roles based on a clearance of dirty blocks from the active buffer.

DESCRIPTION OF THE DRAWINGS

Some embodiments are illustrated by way of example and not limitation in the figures of the accompanying drawings.

DESCRIPTION

Figure 1:
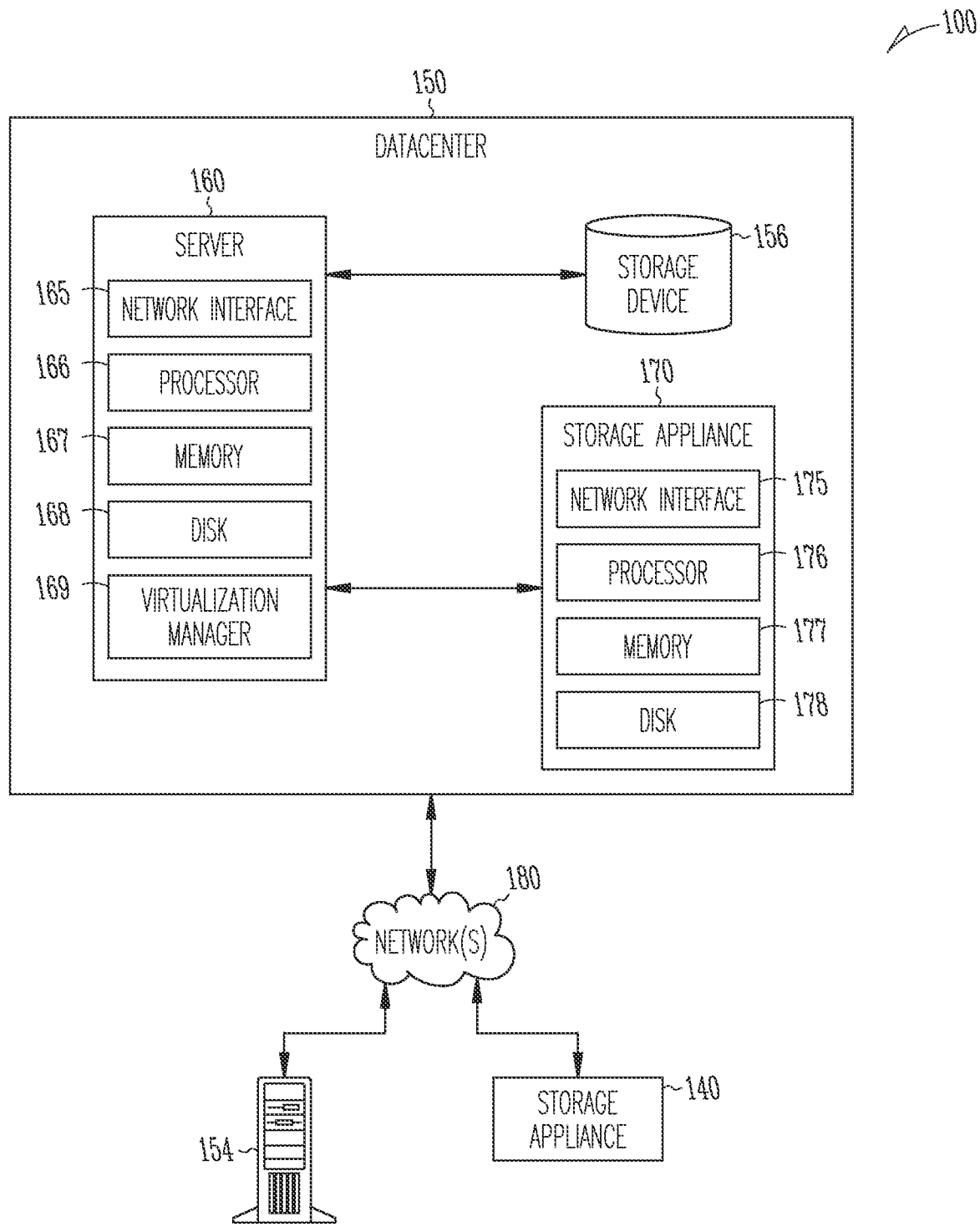
FIG. 1 depicts one embodiment of a networked computing environment 100 with which the disclosed technology may be practiced, according to an example embodiment.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present invention may be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Rubrik, Inc., 2018-2020, All Rights Reserved.

FIG. 1 depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure.

The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a Networked-Attached Storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecured network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients.

One embodiment of server 160 includes a network interface 165, a processor 166, a memory 167, a disk 168, and a virtualization manager 169 all in communication with each other. Network interface 165 allows the server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk file may be set into a read-only state to prevent modifications to the virtual disk file while the virtual machine is in the frozen state.

The virtualization manager 169 may then transfer data associated with the virtual machine (e.g., an image of the virtual machine or a portion of the image of the virtual disk file associated with the state of the virtual disk at the point in time is frozen) to a storage appliance in response to a request made by the storage appliance 170. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business-related applications to a computing device, such as computing device 154. The storage appliance 140 may comprise a cloud-based data management system for backing up virtual machines and/or files within a virtualized infrastructure, such as virtual machines running on server 160 or files stored on server 160.

In some cases, networked computing environment 100 may provide remote access to secure applications and files stored within data center 150 from a remote computing device, such as computing device 154. The data center 150 may use an access control application to manage remote access to protected resources, such as protected applications, databases, or files located within the data center. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

Figure 2:
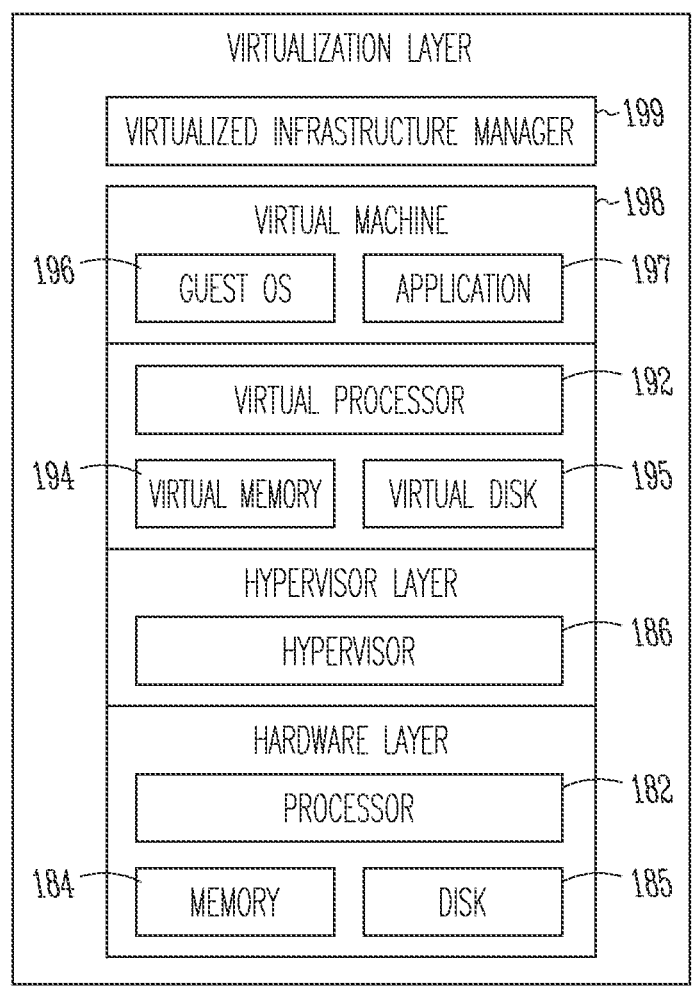
FIG. 2 depicts one embodiment of server 160 in FIG. 1, according to an example embodiment.

FIG. 2 depicts one embodiment of server 160 in FIG. 1. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1 or storage appliance 170 in FIG. 1, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 may or the hypervisor 186 may communicate with a storage appliance, such as storage appliance 140 in FIG. 1 or storage appliance 170 in FIG. 1, using a distributed file system protocol such as Network File System (NFS) Version 3, or Server Message Block (SMB) protocol. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 3:
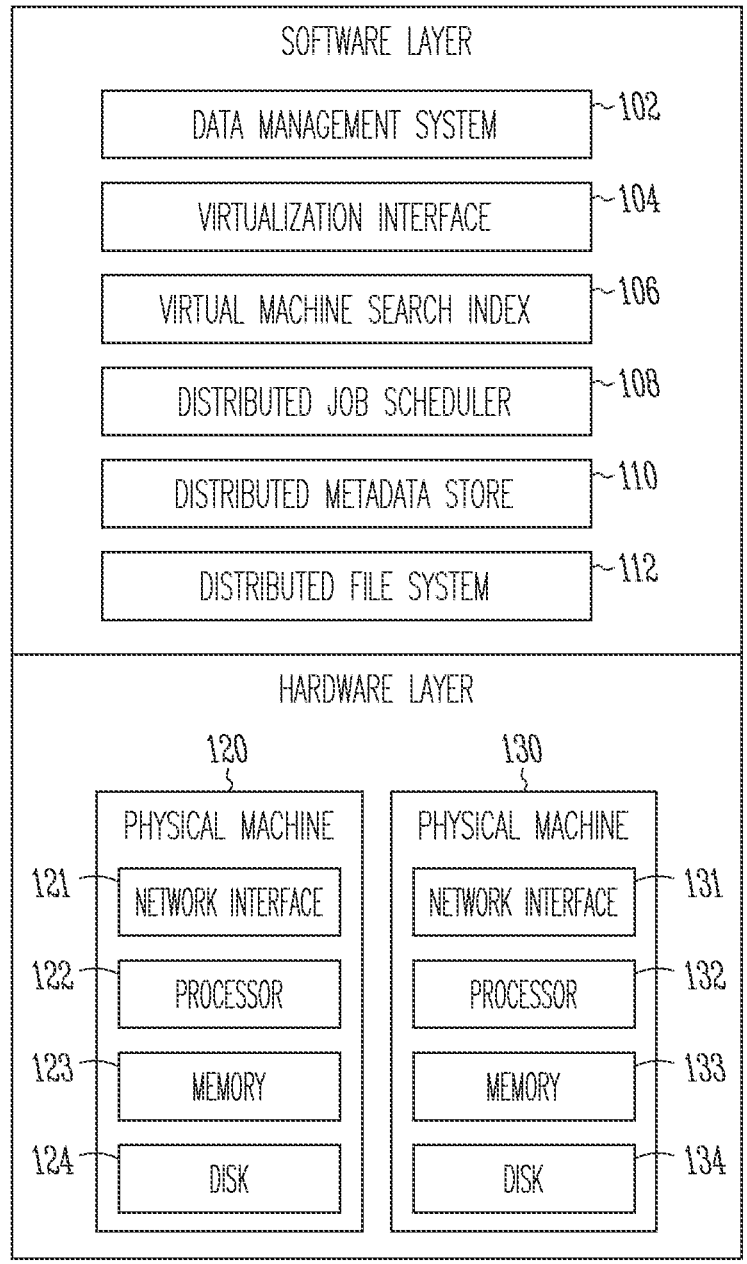
FIG. 3 depicts one embodiment of storage appliance 170 in FIG. 1, according to an example embodiment.

FIG. 3 depicts one embodiment of storage appliance 170 in FIG. 1. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1, or a hypervisor, such as hypervisor 186 in FIG. 2, to communicate with the storage appliance 170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 2 may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG) may be G−i) modulo N. In another example, given a number (N) of nodes in a cluster from node(0) to node(N−1), for a floating IP address (i), the VRRP priority of nodeG) may be (i−j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks or shards. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., an HDD) and the one or more incremental aspects derived from the single full image snapshot may be stored using a second storage device of a second type (e.g., an SSD). In this case, only a single full image needs to be stored and each version of the virtual machine may be generated from the single full image or the single full image combined with a subset of the one or more incremental aspects. Furthermore, each version of the virtual machine may be generated by performing a sequential read from the first storage device (e.g., reading a single file from an HDD) to acquire the full image and, in parallel, performing one or more reads from the second storage device (e.g., performing fast random reads from an SSD) to acquire the one or more incremental aspects.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within 5 minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 2, to create a frozen copy of the virtual machine and to transfer one or more chunks (or one or more files) associated with the frozen copy to a storage appliance, such as storage appliance 170 in FIG. 1. The one or more tasks may also include generating metadata for the one or more chunks, storing the metadata using the distributed metadata store 110, storing the one or more chunks within the distributed file system 112, and communicating with the virtualized infrastructure manager that the virtual machine the frozen copy of the virtual machine may be unfrozen or released for a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 112 (e.g., the first chunk is located at /snapshotsNM_B/sl/sl.chunkl). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 104 may provide an interface for communicating with a virtualized infrastructure manager managing a virtualization infrastructure, such as virtualized infrastructure manager 199 in FIG. 2, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that include the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 3.

The data management system 102 may comprise an application running on the storage appliance that manages and stores one or more snapshots of a virtual machine. In one example, the data management system 102 may comprise a highest-level layer in an integrated software stack running on the storage appliance. The integrated software stack may include the data management system 102, the virtualization interface 104, the distributed job scheduler 108, the distributed metadata store 110, and the distributed file system 112.

In some cases, the integrated software stack may run on other computing devices, such as a server or computing device 154 in FIG. 1. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Figure 4:
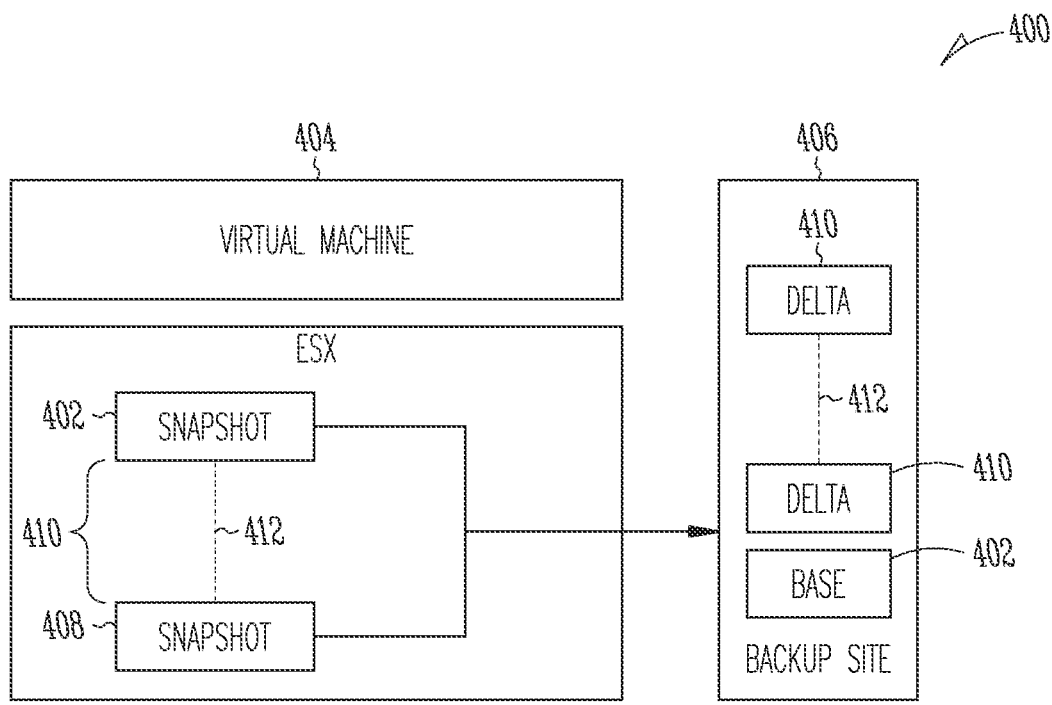
FIG. 4 depicts a networked environment, according to an example embodiment.

Aspects of the present disclosure may be used in conjunction with a snapshot-based approach. With reference to FIG. 4, in a networked environment 400 a base snapshot 402 may be taken for example when a protection policy (e.g. under a Service Level Agreement) is enabled on a VM 404 and its virtual disks. After the base snapshot 402 is saved on a backup site 406, incremental snapshots 408 are taken periodically. A delta 410 between the two snapshots 402 and 408 represents data blocks that have changed, and these blocks 412 may be sent to and stored on the backup site 406 for recovery when needed. Since taking snapshots may be an expensive operation and can impact users, snapshots are typically taken some minutes apart, often from the tens of minutes to several hours and without certain techniques discussed herein this can result in a poor RPO.

In some instances, taking snapshots may involve relatively heavy operations performed on a periodic basis, perhaps several hours apart and then replicated to data recovery (DR) locations. These snapshot-based solutions typically meet data protection needs for applications where the service level objectives can accommodate hours of data loss in the event of disaster. However, for other applications there is a requirement to reduce the potential loss to minutes, or even seconds, of data loss. Snapshot-based solutions cannot typically scale to meet these aggressive requirements, and users may be obliged to adopt alternate methods such as replication at the application, database, storage, or hypervisor level.

Some examples herein seek to address this gap by delivering a continuous data protection capability enabling users to protect, for example, high value applications and deliver near-zero RPOs. Users may still enjoy a near seamless experience in integrating with traditional "discrete" snapshots, extending existing services such as SLA domains, transport models for archival sites in the cloud or on premises (on prem), global searching, and recovery models.

Figure 5:
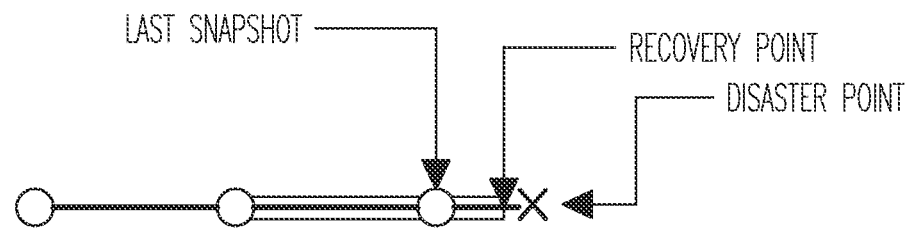
FIGS. 5-6 show timelines of example use cases, according to an example embodiment.

With reference to FIG. 5 which shows a timeline of an example use case, a virtualization administrator may for example accidentally delete a VM at the illustrated "disaster point". The administrator may wish to restore that VM locally from the latest point in time prior to deletion of the VM. With a snapshot-based approach the recoverable data may be several hours old, as shown for example at the illustrated "last snapshot". Some examples herein provide continuous data protection (CDP) allowing data recovery from an RPO point a few moments ago, as shown for example at the illustrated "recovery point". The term continuous data protection herein means "near-continuous" or "substantially" continuous, providing in some instances an RPO of less than a minute (60 seconds). Longer RPO's in the range of 1 to 5 minutes are possible using the disclosed techniques. Ideally, an RPO will exist only a few seconds before the VM was deleted. Similarly, in the case of a storage failure at a local data center, by using the techniques described herein some examples allow the recovery of multiple VMs remotely from the most recent version of the data which may only be a few seconds old.

Figure 6:
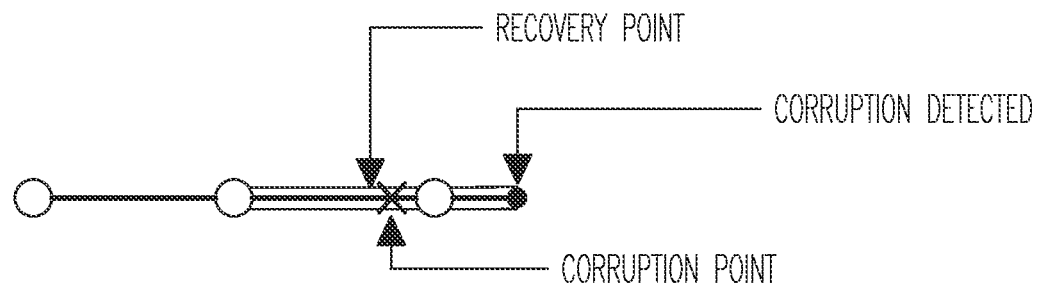

With reference to FIG. 6, in another example a backup administrator may wish to recover from a breakdown, at a local or remote site, from an historical point in time closest to the point prior to when the breakdown was detected. Say, for example, a data corruption occurs at a "corruption point" and is only detected sometime later at a "corruption detected" point, a snapshot-based approach would only allow recovery from an uncorrupted snapshot existing prior to the corruption point. A corrupted snapshot taken after the corruption is not a viable recovery point even if it was taken before the corruption was detected. A recent viable uncorrupted snapshot may not exist, in fact a viable snapshot may only exist several hours or, in extreme cases, days ago.

Examples of the present disclosure allow for a recovery point "just before" (i.e. an RPO of near-zero) the corruption point.

Figure 7:
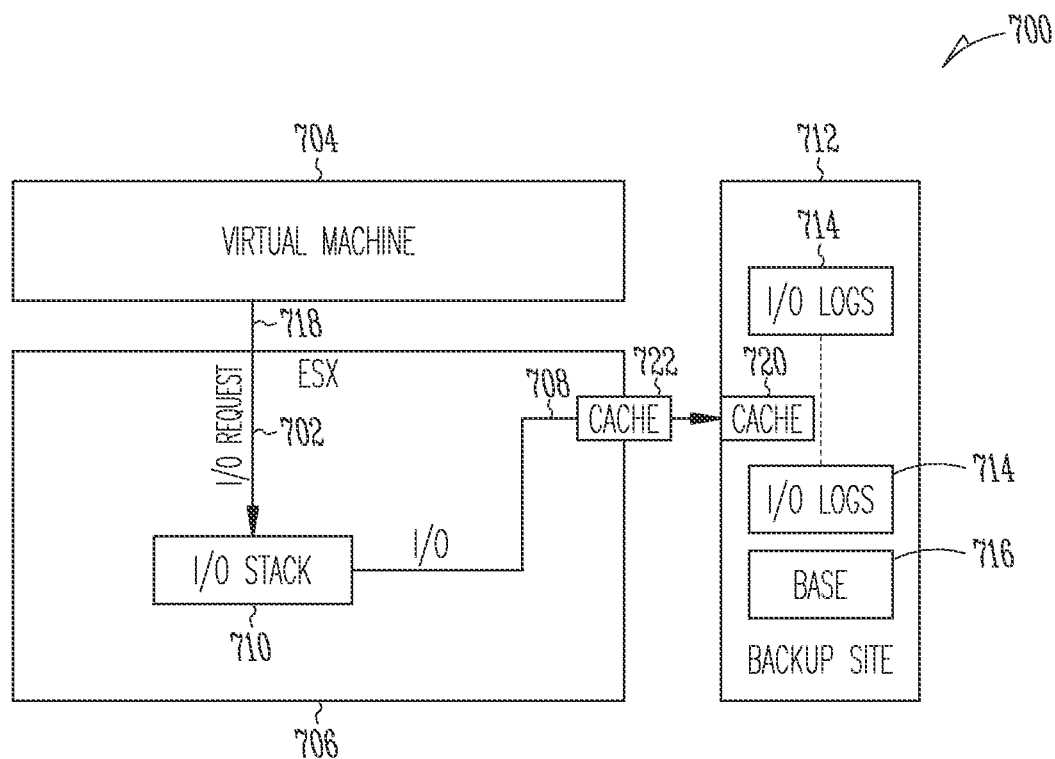
FIGS. 7-10 depict networked environments, according to example embodiments.

With reference to FIG. 7, in a networked environment 700, in some examples virtual disk I/Os that are exchanged between a virtual machine (VM) 704 and a virtualization server, for example an ESX (hypervisor) server 706, are intercepted at an I/O stack 710 in an I/O path 702. The I/O interception and stack allows the I/O to be replicated at 708 to a backup site (or log receiver) 712 at near real time. This may be done with minimal user impact. The I/O replication may in some examples substantially eliminate a need to take snapshots periodically. RPO may be reduced down to seconds. I/O logs 714, discussed further below, are created.

More specifically, in some examples, I/Os are intercepted in an I/O path and allow the collection and replication of changed data. When an I/O is requested for example at 718, it goes through the ESX's I/O stack 710 and the I/O can be intercepted and replicated to a backup site 712. The replicated I/Os are stored in logs 714 which can be used for recovery by applying the I/Os on top of a base snapshot 716. Because the I/Os are intercepted and replicated while the I/Os are going through the I/O stack 710, there is a minimal delay before the I/O reaches the backup site 712, and RPO is reduced significantly. A filter framework, such as a VAIO filter framework for example (see FIG. 8), may allow minimal user impact by inserting a filter driver inside the ESX server 706 to intercept and replicate the I/Os.

Figure 8:
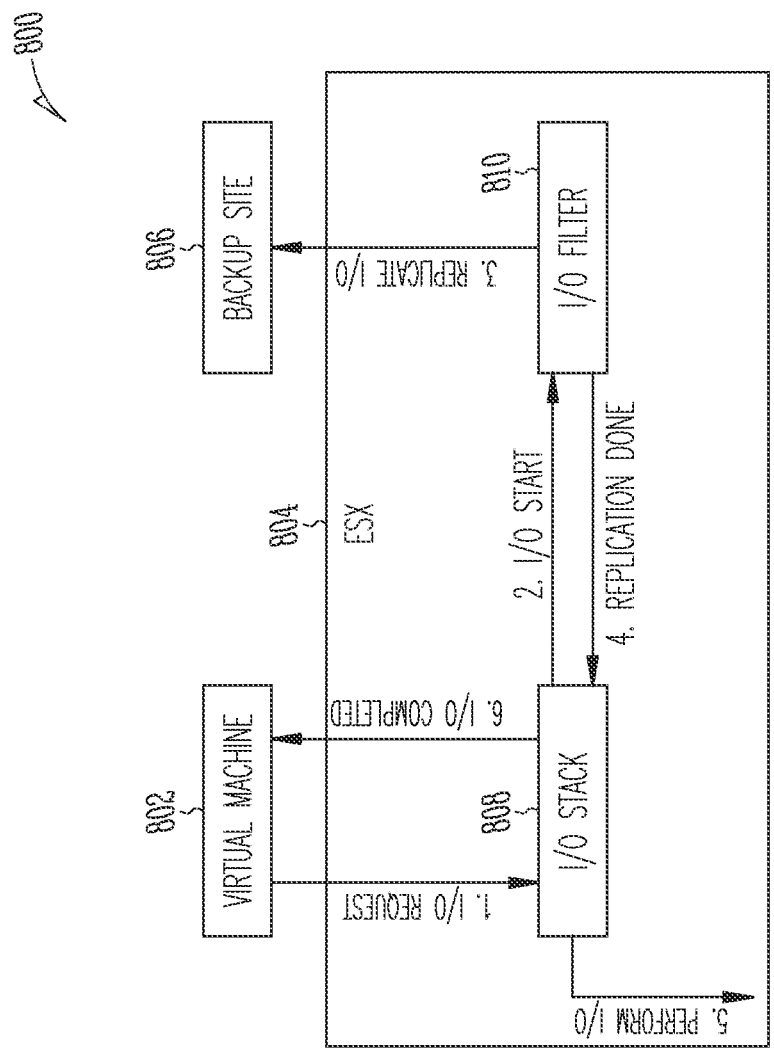

With reference to FIG. 8, a networked environment 800 includes a virtual machine (VM) 802, an ESX server 804, and a backup site 806. The ESX server 804 includes an I/O stack 808 and an I/O filter 810. The I/O filter 810 (also known as a replication filter, or plugin filter) may include a plugin filter driver to intercept I/Os for the purpose of caching and replication. An example replication method may include the I/O operations 1-6 as indicated. The illustrated filter framework can, in some examples, provide one or more touch-points during an I/O's life cycle, for example start, cancel, complete, and so forth. A filter driver can in some examples be configured to intercept an I/O at any point. For efficiency reasons for example, a filter may be configured to intercept only completed I/Os and may significantly reduce the complexity of managing the life cycle of I/Os accordingly. The labeled arrows in FIG. 8 represent an example workflow of a replication filter.

Figure 9:
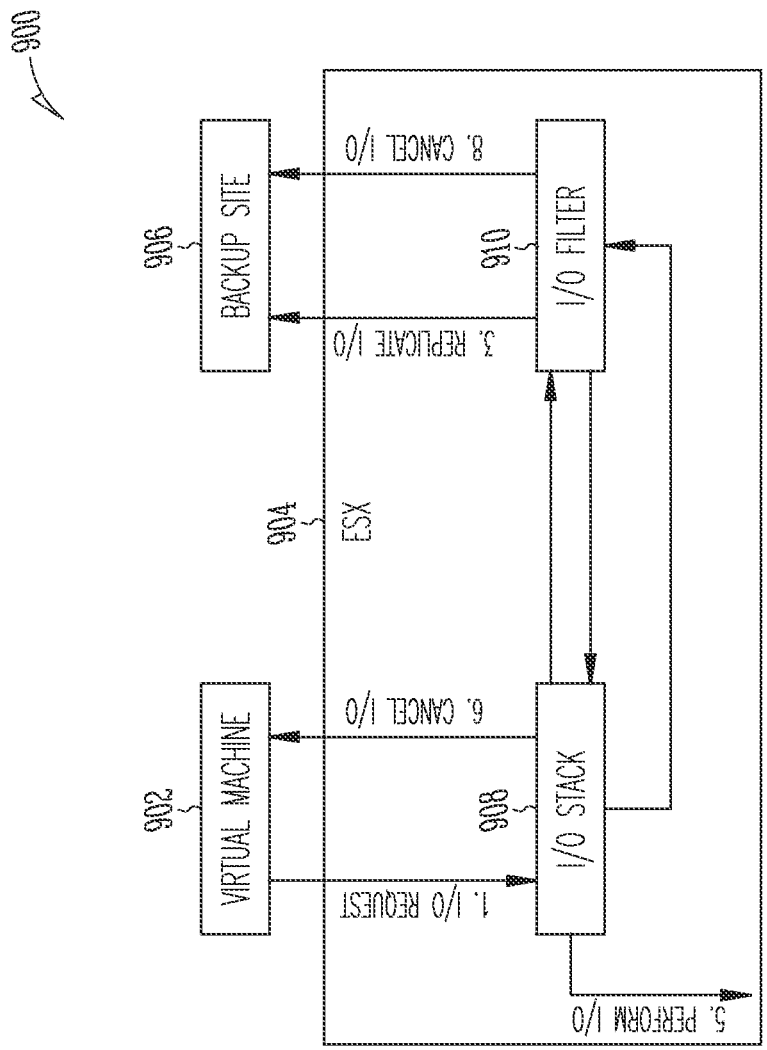

Some examples address replication complications that may arise from I/O cancellations. Replication can become more challenging and complicated if an I/O cancellation occurs. In the networked example 900 of FIG. 9, both of the I/O filter driver 910 and backup site 906 may require an ability to handle cancelled I/O's. A distributed I/O cancellation is complicated and leaves much room for error and data recovery unreliability. To address complications arising in such an implementation, a replication method may include the I/O operations illustrated in FIG. 9. In some examples, instead of replicating I/Os at an I/O start (i.e. a selected touch-point mentioned above), I/Os are in some examples replicated at an I/O completion (another selected touch-point mentioned above). A I/O cancellation occurring between an I/O start and an I/O completion is thus rendered moot. In some examples, the use of I/O data collection (as opposed to snapshots) and the ability of the filter framework to select a touchpoint for data collection allows complicated I/O cancellation ordinarily handling by the filter driver and backup site to be eliminated.

Figure 10:
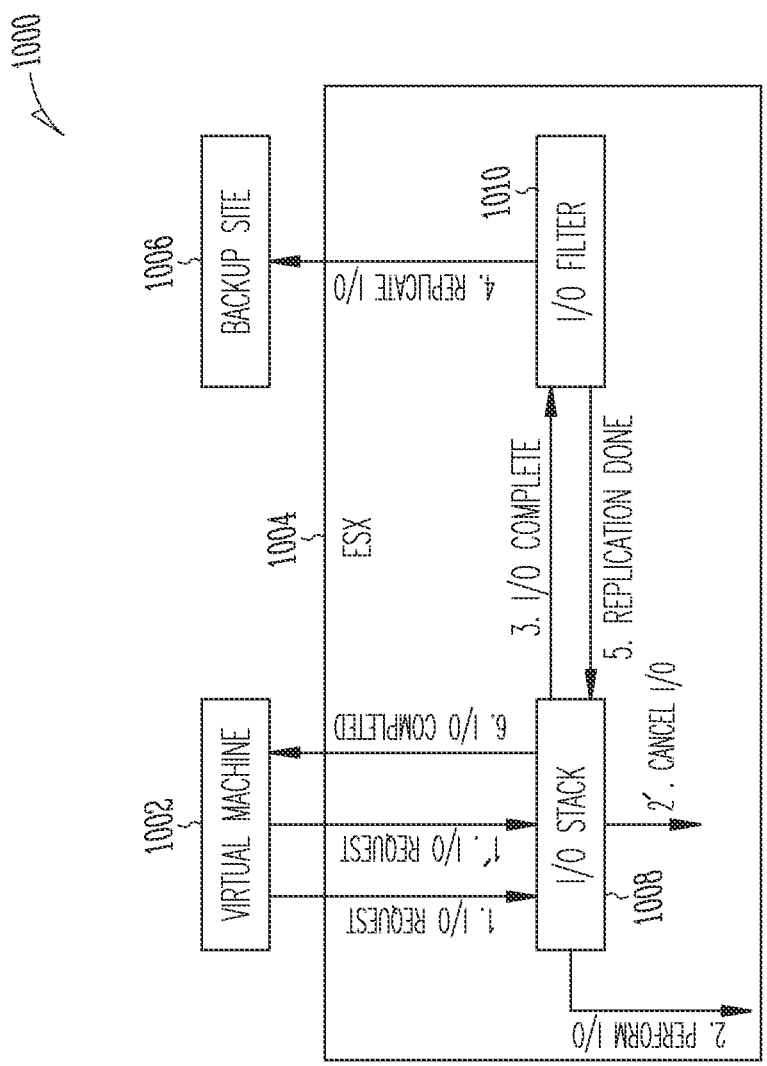

With reference to another example networked configuration 1000 in FIG. 10, I/O cancellation is managed by the I/O stack 1008 of the ESX server 1004 and is not populated to the I/O filter 1010. A replication method may include the I/O operations as shown.

Thus, in some examples, an I/O based recovery enables an optimized RPO. A filter framework enables tap off of I/O data at an ESX server (or hypervisor) between a VM and production storage. I/O data is obtained without affecting production latency. A filter touchpoint selection allows selection of various I/O touch-points to configure I/O collection. This enables a parsing of various portions of I/O data, instead of having to process full I/O stream. A specific touch-point selection of completed I/O's addresses the problem of how to handle distributed I/O cancellations. By replicating at I/O completion, prior I/O cancellations are rendered moot.

In some examples, a cache or buffer 722 (FIG. 7) may be provided between an ESX server (e.g. ESX server 706, 804, 904, or 1004) and a backup site or log receiver (e.g. backup site 712, 806, 906, or 1006). I/O data can include blocky chunks of data, some of very large size. This can overwhelm resources at a backup site. A cache smooths out the I/O data flow and enables use of existing resources at a "snapshot" backup site. In some examples, two (or more) caches are provided, for example a network cache and a backup site (or log receiver) cache 720 (FIG. 7). In some instances, a single cache may be overwhelmed at extreme I/O flow. A network cache and a backup site cache work in tandem to smooth I/O flow to the backup site (receiver).

In some examples, some or all of the I/O data is replicated directly to memory, not to disk as handling massive I/O data can be a challenge. In some examples, the I/O data remains in memory until it is replicated, or the I/O data may be replicated directly from memory. In some examples, sequence numbers are added to the I/O data write and/or read paths to detect I/O data gaps, corruption, and so forth. The monitoring of consecutive sequence numbers may allow a confirmation that full I/O data was sent and received. This check can be done and supplemented before mounting so that only good data is used and/or replicated.

Some example filter frameworks include a timestamp module, and an offset module. Reconciling an ESX server timestamp (collection point) with a backup site (recovery) Rubrik timestamp can be challenging. A large data block remount can be difficult in timestamp offset situations, and the timestamp and offset modules are configured to calculate and adjust for this difference. This ability may in turn enable a convenient RPO selection for example by depicting a slider bar in a graphical user interface (GUI) and enable successful large data block remounts based on slider selection, notwithstanding a timestamp offset between an ESX server and a backup site. Some examples may include a timestamp journal and index to identify a correct RPO point, and a near-zero RPO by pointing in real-time to an offset and enabling the correct data to be read at a precise moment it is need.

The management of the I/O stream and the I/O logs 714 at the backup site 712 (see, for example FIG. 7) is now described more fully. In some embodiments, in addition to taking snapshots, a continuous data protection (CDP) system maintains I/O logs for virtual machines. Some examples enable point in time recovery by replaying logs on top of a base snapshot. In some examples, a sub-minute (i.e. less than 60 seconds) recovery point objective (RPO) is achieved assuming sufficient network bandwidth. Occasionally, replication of a base snapshot may be absent or delayed. In a catchup situation, newer logs in multiple logs on top of a base snapshot may be prioritized for replay.

With reference again to FIG. 8, a filter (for example a VAIO filter) 810 sends I/Os to a log receiver (e.g. a backup site 806, or a CDP service) using for example code division multiplexing CDM. CDM is a networking technique in which multiple data signals are combined for simultaneous transmission over a common frequency band. The log receiver buffers the received I/O's in memory and periodically (based on a time/buffer size threshold) flushes them to a log file. A log file may be included in an I/O log 714 (FIG. 7), on top of a base snapshot 716 (FIG. 7). The logs 714 roll over in the event of a new snapshot, time, or size-based threshold. Some examples replicate these logs to a replication target. In order to support optimum (low) RPOs, data is replicated as soon as it received. Thus, in some examples, a push-based replication approach is utilized, as opposed to pull-based models.

As mentioned above, example embodiments may include a network buffer 722 and/or a log receiver buffer 720. A buffer 720 allows a log receiver 712 to queue the I/Os to create a fast path for logs to replicated assuming there is sufficient network bandwidth. If a required log sequence is not in the buffer 722, the log receiver 712 reads sequentially from disk until a catchup. In some examples, a catchup may include reading a missing portion of records from a disk without necessarily reading all the way to the end of disk as the log receiver 712 has filled up the gap between two logs in the memory records. A source component at the log receiver may ensure that records are received by a replication target (e.g. a database, a backup site, or a VM requiring backup data) and schedule flushes of the records to a log file on disk in order. Logs at the source component and the replication target maintain a one to one mapping. This implies a given log on source will either not be replicated at all or will be replicated completely to the replication target with the same logId.

Figure 11:
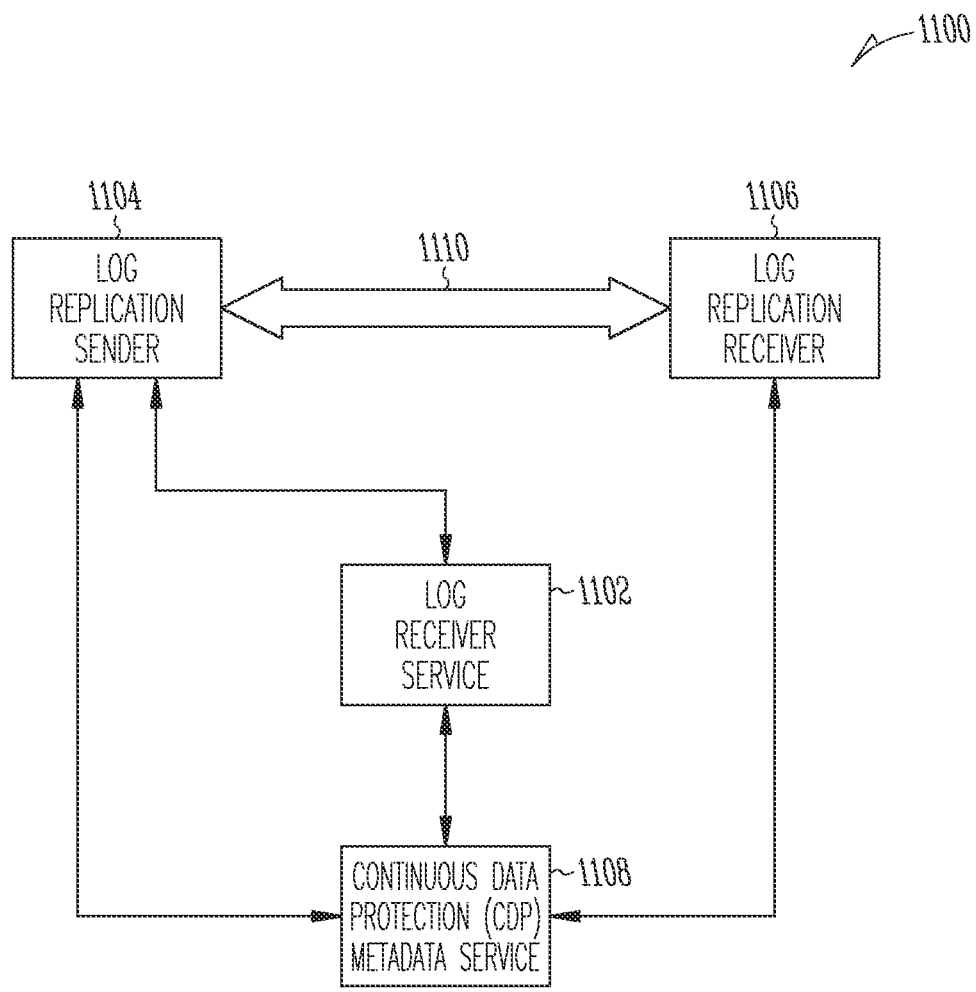
FIG. 11 shows aspects of an example log receiver, according to an example embodiment.

With reference to FIG. 11, an example log receiver 1102 resides in a networked environment 1100. A log receiver (also termed a backup site, or log receiver service herein) may provide certain services and include (or interact with) a log replication sender 1104, a log replication receiver 1106, and a CDP metadata service 1108. In some examples, the log replication sender 1104 runs on a data or I/O source component and is responsible for sending data from the source component to one of more replication targets. In some examples, the log replication sender 1104 resides in a log receiver data service. The log replication sender 1104 can communicate at 1110 directly to a log replication receiver 1106 residing at a replication target. In some examples, the log replication sender 1104 and the log replication receiver 1106 are on different nodes. For each node of a source cluster, the log replication sender 1104 communicates with the log replication receiver 1104 on that node and the CDP metadata service 1108 on that source node. For each node of a target cluster, the log replication receiver 1104 communicates with the CDP metadata service 1108 on that target node.

In some examples, the log replication receiver 1106 runs at a replication target and in some examples resides in an existing replication service (e.g. a snapshot replication service). This may provide some convenience in that a client may not be required to perform additional configuration for CDP replication as the same ports may be used and network address translation (NAT) configuration may be continued. The log replication receiver 1106 is responsible for receiving data from the log replication sender and adding it to a log file (e.g. an I/O log 714 in FIG. 7). Some arrangements include a separate log replication receiver 1106 and send proxy requests through an existing snapshot replication service. Proxying can increase overall memory requirements as the same amount of memory would be required on both the log replication sender 1104 and log replication receiver 1106 at steady state data transfer. In some examples, the CDP metadata service 1108 runs on both the data source component and the replication target. The log replication sender 1104 and the log replication receiver 1106 communicate with the CDP metadata service for all metadata operations.

In some examples, the log replication sender 1104 includes a metadata service component responsible for metadata operations and a data service component responsible for data transfer. The data service component calls an application programming interface (API) such as a write-ToLog API on the log replication receiver 1106 to replicate records. The log file to be replicated may be a closed file or an open file currently receiving data records from an I/O filter (e.g. I/O filter 810 in FIG. 8). In the case of closed replication, records (I/O data) are read from the log file on disk and replicated. In the case of live replication, it is not necessary to read the records from disk but instead directly replicate the records received from the I/O filter 810 by using an in-memory buffer. In some examples, this may be performed as follows.

The log receiver 1102 receives records (I/O data) from the I/O filter 810, stores the records in memory (e.g. I/O logs 714), and then flushes the logs to a distributed or scale data file system periodically. Once the records are flushed, the log receiver 1102 calls a live replicator manager to perform live replication before the log receiver 1104 removes the flushed records out of its memory. The log receiver 1102 instructs the live replication manager to replicate records [for example, records m, n]. The live replication manager checks its own memory usage and if the combined size of the records (m, n) fits into the memory of the live replication manager, the live replication manager moves the received records to its own memory and queues a replicate request to a live replicator worker and indicates the records are in memory. If the received records do not fit into its memory, the live replicator manager will ignore the records and queue a replicate request to the live replicator worker and indicate that the records are on disk. The live replicator worker reads a replicate request from the queue. If the records are in memory, it reads the records from memory and sends them to the log replication receiver 1106 and removes the records from memory to free up space. If the replicate request indicates that the records are on disk, it will read from SDFS, then replicate to the log replication receiver 1106.

Certain APIs may be used in conjunction with the log replication sender 1104. A replicateLog API is used for replication which may be closed, or live replication as discussed above. Once all the records for a given log are replicated, the log replication sender 1104 calls a signalReplicateLogCompletion API on the metadata service component. A replicateLogStatus API is used to check the status of the replication which is ultimately reported on a graphical user interface (GUI) as a remote recovery point (e.g. a GUI on a physical machine 120 or 130 of FIG. 3).

In some examples, the log replication receiver 1106 comprises or provides a thrift service on a target cluster (e.g. a cluster discussed with reference to FIGS. 1-3 above) that is responsible for receiving logs sent by the log replication sender 1104. In some instances, the log replication sender 1106 may try to replicate or send the same log multiple times in case of crashes, lost acknowledgments, and so forth. The log replication receiver 1106 is responsible for dealing with duplicate data. In some examples, the log replication receiver 1106 maintains an in-memory handleId to generate a disk-id map which is populated on each openLog call by the log replication sender 1104. If the log replication receiver 1106 receives a call without a valid handleId, it generates an error.

Certain APIs may be used in conjunction with the log replication receiver 1106. An openLog API determines the node on which a disk should replicate using round robin or random assignment techniques for load balancing. The API may generate a unique handleId which is used in all subsequent requests by the source. The API may review a log table to determine a last replicated log. In the event of source side crash, a previously assigned node id should exist for the disk, accordingly. In some cases, there may be a partially replicated log. The log content of the partially replicated log is deleted, and the replication starts afresh. A resumability (i.e. an ability to resume) function may be established at this point. A call to a writeToLog API contains a list of requested records for replication and the requested records are queued to an in-memory buffer. In some examples, the records are flushed to the disk in-order by a daemon (background process). If the in-memory buffer is full because it is holding out of order records, then the API responds with a sequence out of order status. At this point, the log replication sender 1104 may retry starting from the last record received in-order. A closeLog API is utilized when the log replication sender 1104 has sent all the records for a given log. The log replication sender 1104 then it sends closeLog request to signal the end of the log. At this point, the log replication sender may call a finishCreate log store API.

In some examples, the CDP metadata service 1108 scans disks in an I/O stream source table periodically to determine and claim a replication owner node for a disk. Each disk (or I/O stream source) has a replicationOwnerId to ensure that only one node is working on replicating logs for that disk at a time. This operation may include a worker pool which processes each disk that is seeking replication from the relevant node. In some examples, a worker claims replication ownership for the node to ensure only one node is replicating for a disk. The worker determines the next log to be replicated by calling a replication orchestrator, discussed in more detail below. The worker generates a unique handleId for each log replication which is used in all API requests. In some examples, the worker calls an openLog API of the replication target to initialize log replication with the unique handleId, and a replicateLog API of a data service on the relevant node with the log information, the handleId, and targetNode information which does the replication of data records. A signalReplicateLogCompletion API is called by the data service once it finishes replicating all the requested records. This API may call a finalizeLog API of the replication target which marks the log as finalized on the target. A replication status of the log on the source may be changed to a replicated status accordingly.

Some embodiments include an algorithm to filter disks (e.g. VM disks by the I/O filter 810, FIG. 8) and determine a replication owner node. For disks which receive I/O records from the I/O filter 810 and replication is enabled (e.g. an effective service level agreement (SLA) has replication enabled), the replication owner is same as the log receiver 1102 owner. This enables a read from the log receiver 1102 buffer (e.g. buffer 720, FIG. 7) and creates a fast path of data transfer when replication can keep up with the incoming I/O stream (e.g. I/O stream 708, FIG. 7). This configuration also allows the use of the same load balancing as used by the log receiver 1102 even when log replication lags behind. For disks which have no assigned log receiver owner (implying the disk is not receiving I/O records), but for which log replication is enabled, node ownership is claimed based on a sharding technique so that these disks can be distributed equally among the source nodes.

Some embodiments include a replication status poller. The metadata service of the log replication sender 1104 maintains an in-memory queue containing handleIds of logs that are replicating from the relevant node. The poller is responsible for determining a timestamp of a last replicated data record. The timestamp is used for remote recovery point calculation, cleanup in the event of a service restart, or other unknown failures.

In some examples, the poller periodically (for example, every 30 seconds) calls an API (for example, replicateLogStatus(handleId) API) to identify the timestamp of the last replicated data record and persist this information in a database. This information may be stored for example as diskId→(current replicating log id, timestamp of last replicate data record, lastUpdateTime). This information may serve to compute a remote recovery point. In some examples, the database does not update if the data service is down or if it is not replicating any data with respect to handleIds generally, or the specific handleId. If the lastUpdateTime is more than 30 minutes ago (for example), the poller concludes that something is amiss as the log is not being replicated. A next step may include performing a cleanup operation of the session with respect to the relevant handleId and then restart replication for the disk. In some examples, cleanup is performed done by calling a deleteLog API for (handle_id, log_id).

A unique handle identification (handleId) may be important in some embodiments. For example, a unique handleId is used for an initial handshake (using the openLog API) to establish all replication requests with respect to a given log being sent by the applicable unique handleId. There can only be one active handle identification for any disk and a unique handleId is generated for each log replication. Using a unique handleId may be important because replication requests communicated over a wide area network (WAN) can return a client error or timeout status with respect to a data source but it is still executed on the target. Further, if a previous finalizeLog API or deleteLog API for a given log is executed later on the target, this could lead to inconsistent state. But as each log is verified with respect to a current active handleId, these errors or inconsistent requests can be ignored.

As discussed above, in some embodiments replicated I/Os are stored in logs 714 which can be used for recovery by applying the I/Os on top of a base snapshot 716. Some present embodiments include a CDP replication orchestrator to determine and prioritize base snapshots for replication (for example, base snapshot 716, FIG. 7), as opposed to other SLA snapshots.

In some embodiments, an orchestrator accesses for replication at least the following information from a I/O stream log table: a logId; a base_log_id; a StreamSourceId or a vmwareDiskId; a replication status such as to replicate (no work yet done on replicating a log), in_progress (a worker is currently replicating the log), or replicated (the log has been replicated to the target cluster); and a base snapshot identification (for example, base snapshot 716, FIG. 7). In some embodiments, the orchestrator may also identify or access a stream source including a StreamSourceId and replication metadata. The replication metadata may include a data store owner nodeId and a claimTime value. A data store handle information may include a handleId, and a log id. Some embodiments also include a snapshot table accessed by the orchestrator during replication operations. In some examples, a snapshot table may store dependent log information which may be read during a pull replication or by an openLog API to add the base snapshot for the log on the replication target.

Figure 12:
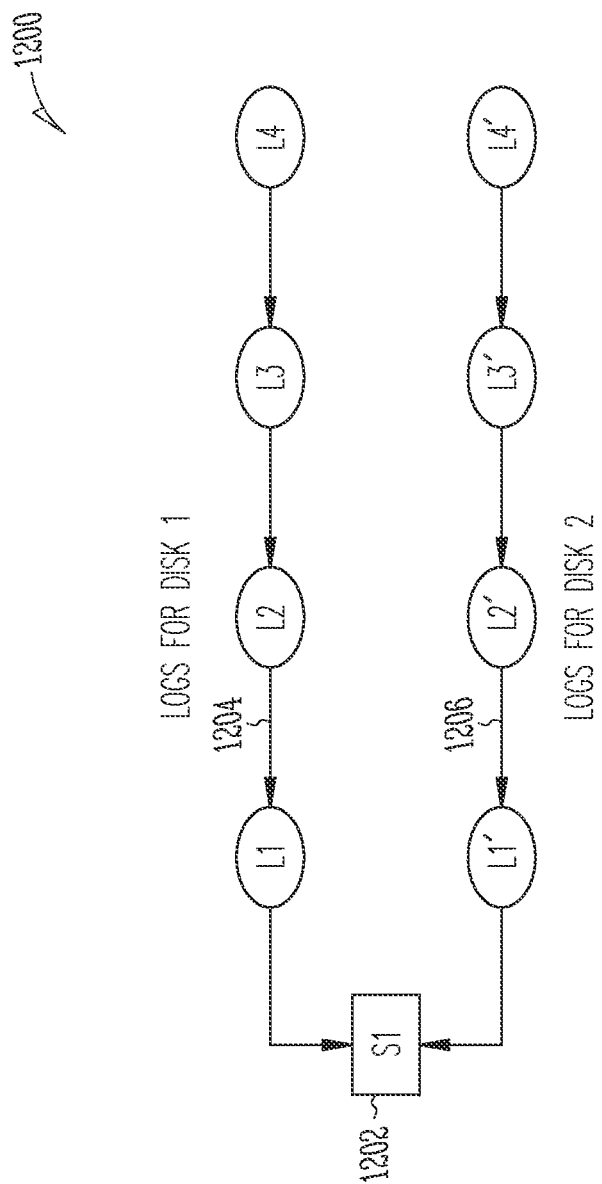
FIGS. 12-25 shows aspects of an example log chains (also termed snapshot-log chains herein, depending on the context), according to example embodiments.

With reference to FIG. 12, in some examples a CDP replication orchestrator abstracts out at 1200 a snapshot-log chain using management logic for determining a next log for replication. Each snapshot-log chain 1200 starts from a snapshot 1202 followed by one or more log chains 1204 and 1206 for it to be recoverable i.e. capable of replication. The snapshot-log chain 1204 may relate to a disk 1, while the snapshot-log chain 1206 may relate to a disk 2. The replication orchestrator is designed to keep track of these chains 1202 and 1204 to oversee an identification and replication of all the snapshots necessary (so-called "must-replicate" or "must-have" snapshots) for the log chains to be recoverable on the replication target and, since a VM may contain multiple disks, a determination that the logs replicated for multiple disks are in sync with one another.

In some examples, the following APIs are exposed by the orchestrator. A GetNextLogToReplicate API returns the next I/O stream to be replicated for a given stream source id. The logic handles all the cases where the disk might be lagging due to slow network connectivity or other reasons. Some examples try to start a chain from a new snapshot if a snapshot falls outside of a retention window. The orchestrator also handles cases in which VM disks are added or removed from the VM inappropriately. A GetNextSnapshotToReplicate API is used by the orchestrator internally to ensure that all "must-have" snapshots are not deleted until they are replicated. A CalculateLastReplicatedTimeInNanos API assists in determining a remote recovery point. The API factors into this determination whether the snapshot is replicated and the last status of the inprogress log which is being replicated.

In some examples, the replication orchestrator also has the functionality to pick up inProgress snapshots and start replicating logs. In some examples, this is done optimistically in the sense that the orchestrator begins replicating IO records with the hope that the snapshot copy step will not fail. If it fails for some reason, then the logs may have to be discarded. Snapshot completion or failure cases are appropriately handled. Specifically, in the case of failure, logs are not replicated anymore and the chain (for example, chain 1202 or 1204) is marked invalid. In some embodiments, all operations to the orchestrator are performed atomically and are thread-safe. Some example embodiments begin collecting I/O records as soon as a 'take snapshot API' call to a virtual center for that virtual machine succeeds. After this, the replication orchestrator copies the data onto a cluster which could take any amount of time based on size and change rates of the virtual machine. In some examples, only when a snapshot is fully copied on to the cluster do the I/O records become recoverable. It is also possible that there is some failure in the copy step. In a failure case, the snapshot is not available and hence I/O records beyond that snapshot cannot be used for recovery.

Some embodiments of a CDP replication orchestrator may include the following design aspects and data structures. For example, data entries in a replication orchestrator table may include a primary key and orchestrator information. A primary key may include a composite identification (compositeId) of a "snappable" i.e. a snapshot, (for example, a "must-have" snapshot and a target cluster identification (targetClusterId). Orchestrator information may include a chain of snapshotAndLogInfo where each chain starts from a snapshot followed by logs for each VM disk. This snapshot may be a "must-have" snapshot and, if so, will be replicated to make the logs recoverable on the replication target. In some examples, a new chain is added to the list on various conditions: for example, a replication on a previous log chain falls out of a retention window for any of the VM disks, or a CDP effort is broken on the source and is then restarted, or a replication encounters an error (for example, a network error or other fault) which results in a log being marked with an error message, for example ReplicatedWithError.

An example data structure may include I/O stream source information such as streamLogIds (OrchestratorList), a doneReplication (Boolean value), and a lastUpdatedTimestamp (for example, Option[Date]=None). The data structure may store a list of streamLogIds for each stream source. Usually the last log in this list is the one which is being replicated or is the next candidate for replication. Some structures also store the lastUpdatedTimestamp to detect a last modification. Orchestrator rows or lists in the data structure may be checked to determine those which have not been updated beyond a specified time and purged. Appropriate pruning logic may be added to an orchestrator list so that a log chain does not grow in an unbounded fashion. Unbounded chains could lead to big metadata rows and cause processing problems.

Snapshot and log information in an example data structure may include one unit of a snapshot-log chain. Some example orchestrators include a mechanism to start a log chain even from an in-progress snapshot. The mechanism may include or access a map from streamSource to StreamSourceInfo and assist in tracking how far each disk has been replicated. The mechanism may also store information to detect if the snapshot needs to be pinned or not and if it has been replicated. Some examples a background replication orchestrator which cleans up the replication orchestrator table in a data structure. This clean up may include removing archived snappable rows and all rows for which a service level agreement (SLA) has changed to a different target cluster. All relevant snapshots are unpinned while removing the chain.

As mentioned above, some embodiments provide the ability for users to protect their workloads and data at discrete points-in-time using snapshots. These snapshots are relatively heavy operations that are performed on a periodic basis, perhaps several hours apart and then replicated to DR locations. Snapshot based solutions meet the data protection needs for applications where the service level objectives can accommodate hours of data loss in the event of disaster. However, for other applications there is a requirement to reduce the potential loss to minutes, or even seconds, of data loss. Snapshot based solutions cannot scale to meet these aggressive requirements, and customers are forced to adopt additional solutions like replication at the application, database, storage, or hypervisor level. To address this gap, some embodiments deliver a new near-continuous data protection (CDP) capability that enable users to protect, for example, high-value applications and deliver near-zero RPOs.

Figure 13:
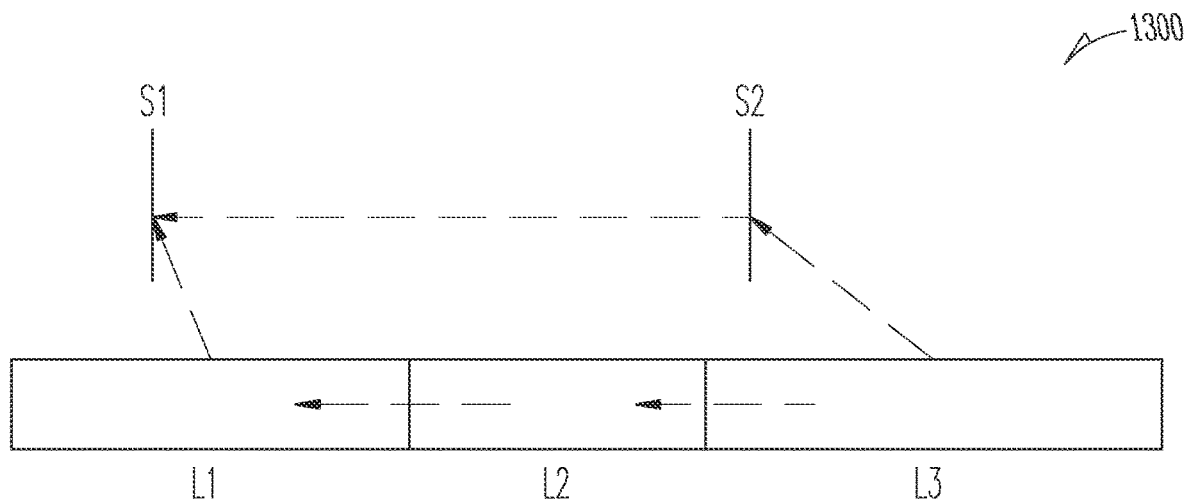

In this regard, to enable CDP, a vendor specific driver captures continuous I/Os, caches them, and sends the I/O data (a.k.a. "stream logs") to clusters. A log receiver service (LRS) running on nodes receives the logs and write them to a disk. Logs are captured after a snapshot is taken. This snapshot will serve as the base of subsequent logs. Logs are captured one after another, a later one depends on the former one. Thus, with reference to FIG. 13, the continuous logs form a log chain 1300. The dotted arrows show the logical dependencies of the snapshots and logs. A log chain is valid only if there is a base snapshot. In other words, a VM is recoverable from a specific continuous point-in-time version (which corresponds to a log) only if there is a valid base snapshot. Once a new snapshot is taken and designated as the new base, old logs may be eligible for expiration or garbage collection depending on the assigned SLA policy.

Typical operations supported by CDP includes obtaining or accessing the recoverable ranges of a VM or recovering a VM from a most recent continuous point-in-time version or recovering a VM from a specific continuous point-in-time version. To support these operations, example algorithms manage the log chain to determine if a log chain is valid for recovery. One algorithm may include determining a shortest log chain, with a valid base snapshot. A second algorithm may include determining a longest log chain, with a valid base snapshot. These algorithms can be used to calculate recoverable ranges of a VM.

Figure 14:
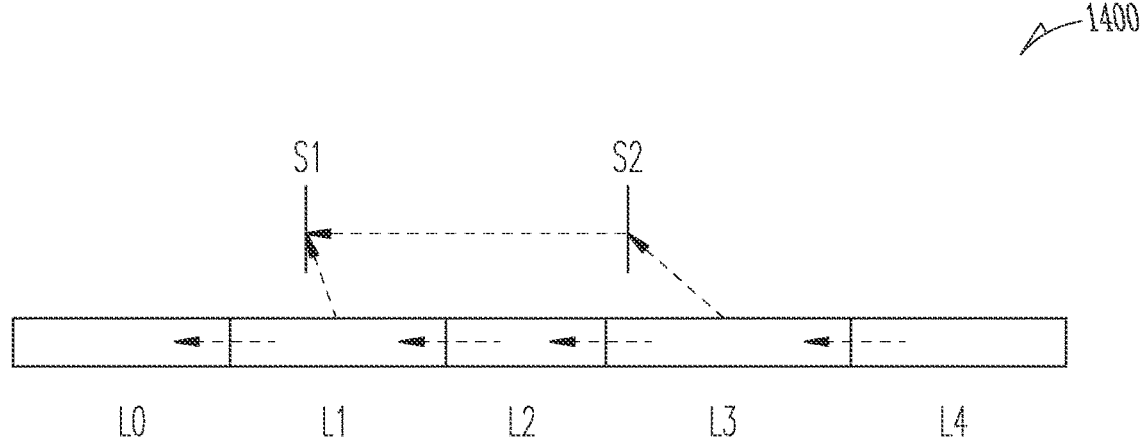
Figure 15:
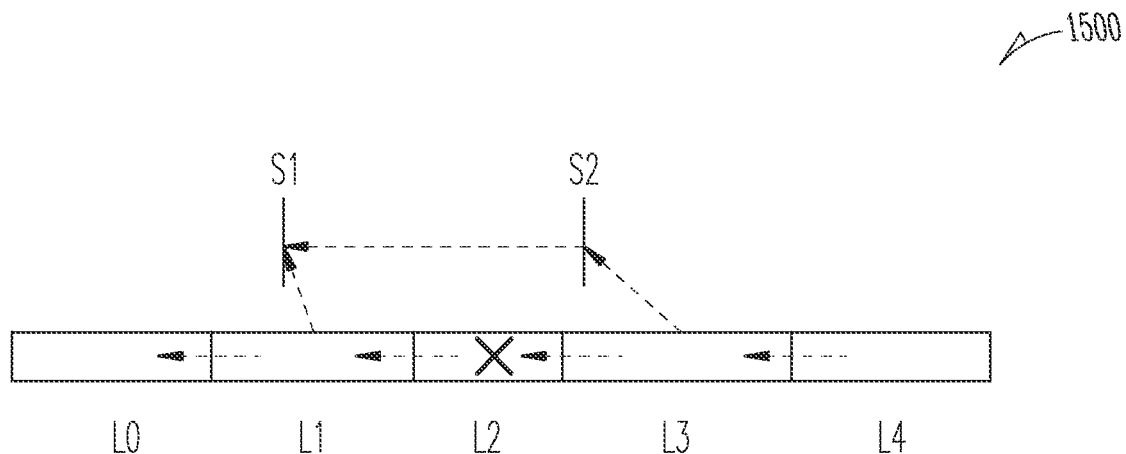

Some examples pin a log chain for recovery or to get recoverable ranges of a VM. An example continuous log chain 1400 is depicted in FIG. 14. In this example, the latest log chain for recovery is {S2, L3, L4}. The recoverable range is {[S1, L4]}. An example broken log chain 1500 is shown in FIG. 15. In this example, the latest log chain for recovery is {S2, L3, L4}. The recoverable range is {[S1, L1], [S2, L4]}. The algorithms can be enhanced to support recovering a VM from a specific continuous point-in-time version.

For purposes of explanation, a stream source may be considered to include an abstraction of any data sources that can produce continuous stream data, for example a virtual disk of a VM is a stream source. A stream log may be considered to include an abstraction of any continuous stream data produced by a stream source. In some examples, stream logs are managed in a form of dependency chain, for example as discussed above). A log may be pinned by 3 different references. A SelfRef reference indicates a log is alive and not expired. A LogRef reference indicates a log is a base of other logs. A JobRef reference indicates a log is being used for recovery (e.g. Live Mount). Building a log chain to enable continuous point-in-time recovery may only be a partial flow in a replication operation, in some examples. Stream logs are like a "stream": the source I/O data continuously "flows" into a cluster. The disk space consumed by stream logs may be significant for some stream sources (for example, virtual disks). In some examples, it is equally important for efficient CDP to ensure that all expired stream logs are recycled to free up the disk space as soon as possible. Log garbage collection (GC) is a process that aims to free up occupied disk space by removing unneeded logs and may be an integral part of a CDP product, in some examples. In a typical garbage collection cycle, any logs that are still referenced will be kept, even if they have expired. The space occupied by logs with no references will be freed and reclaimed to accommodate new logs.

Figure 16:
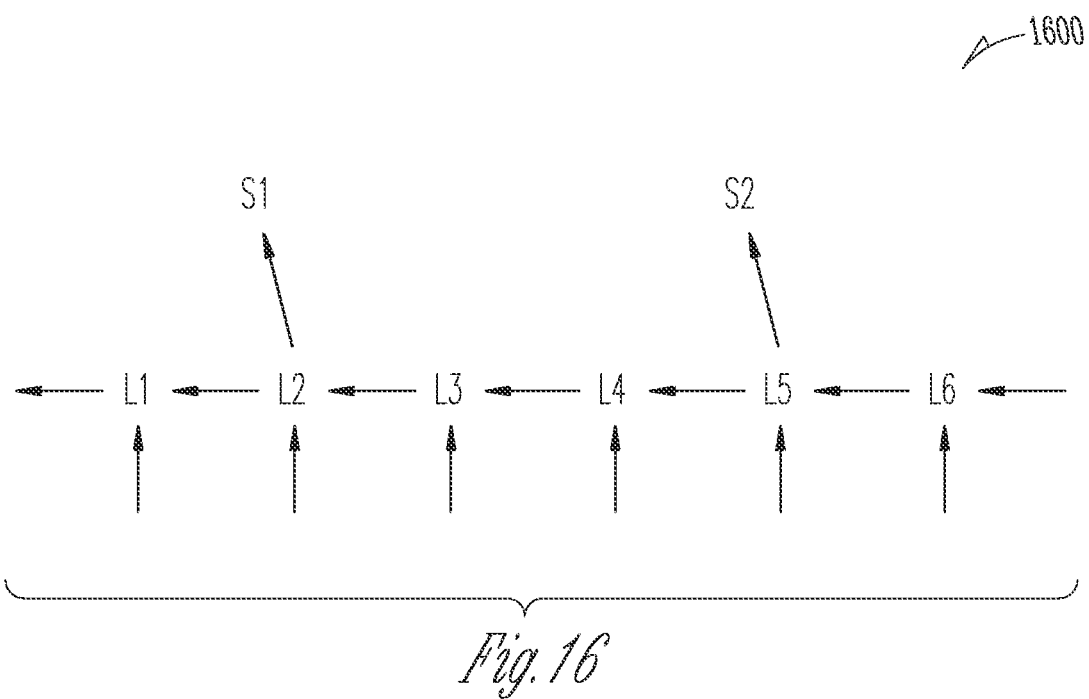
Figure 17:
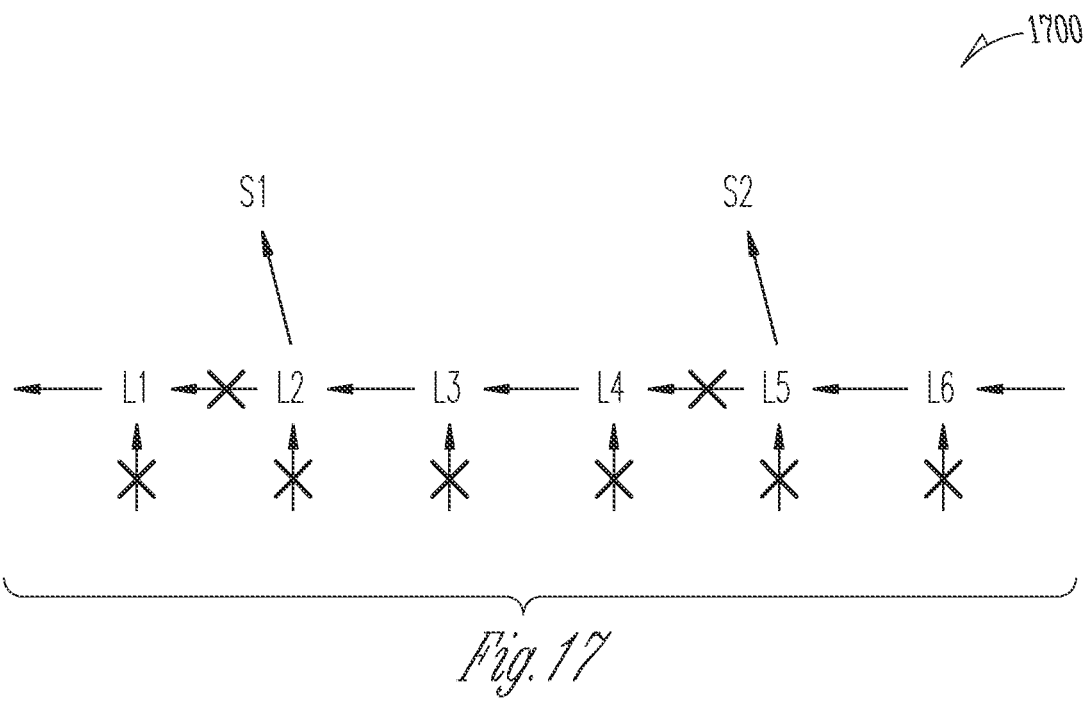
Figure 18:
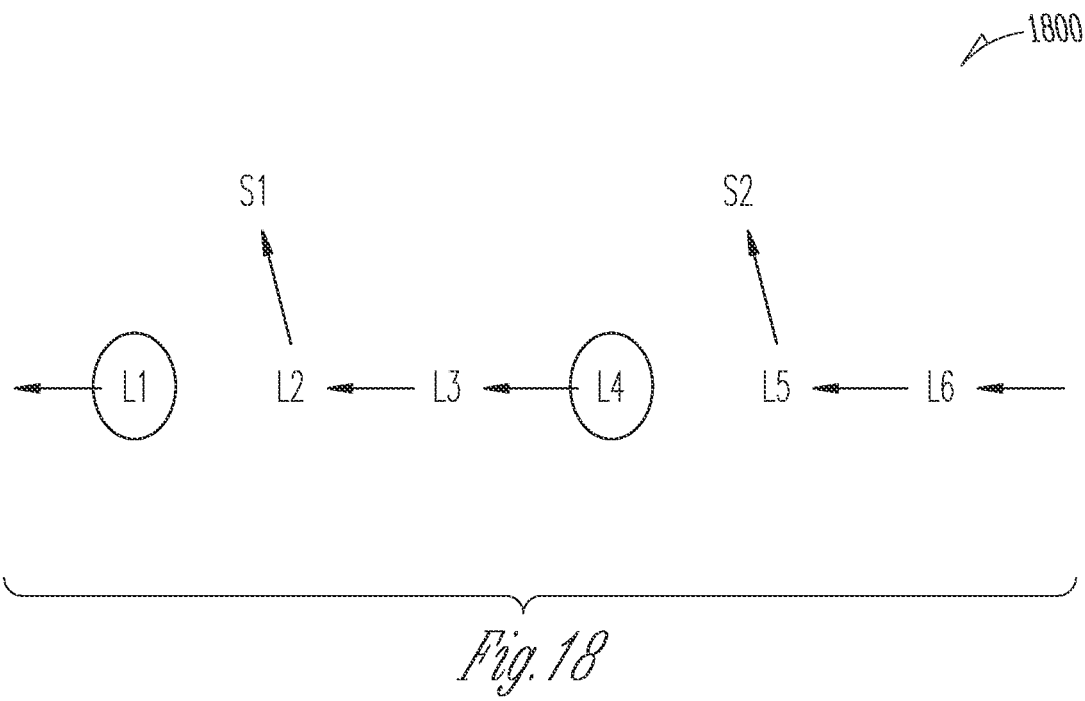

With reference to FIG. 16, example operations in a GC process 1600 are now described. Assume all logs below should be expired based on assigned SLA policy. The following steps describe how an example log GC process works. First, the logs are expired based on SLA policy. Typically, when a new snapshot is taken, old logs should be expired or consolidated. But based on various business requirements, users may want to keep some logs for a longer period. A per stream source job will be scheduled periodically to expire the logs based on SLA policy. The expire job will take care of two things: first, removing self-references if a particular log should be expired according to SLA. Second, if the expired log has a base snapshot, which means it is recoverable without relying on the base log, then remove the reference from base log (if it exists). With reference to FIG. 17, the first operation above will mark a log 1700 as expired, so that it will not be used as a base log for any new logs. The second operation ensures that if a newer log is recoverable from a base snapshot, then it is safe to mark older logs as eligible for GC. After the expiry operation is complete, the log chain may appear like the log 1800 chain in FIG. 18, for example. The circled L1 and L4 are eligible for GC because there's no reference pinned on them.

Figure 19:
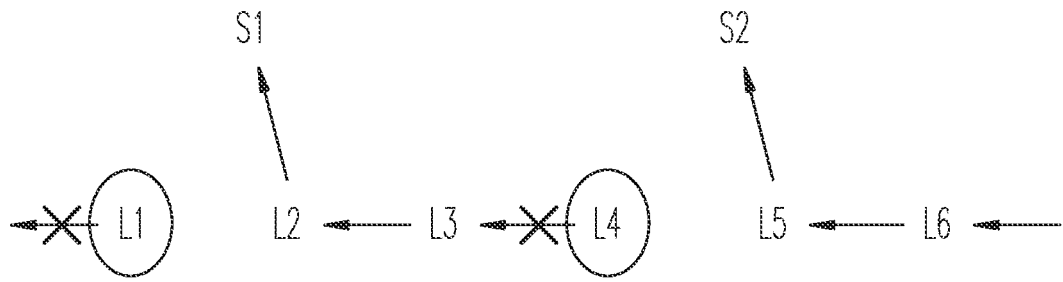
Figure 20:
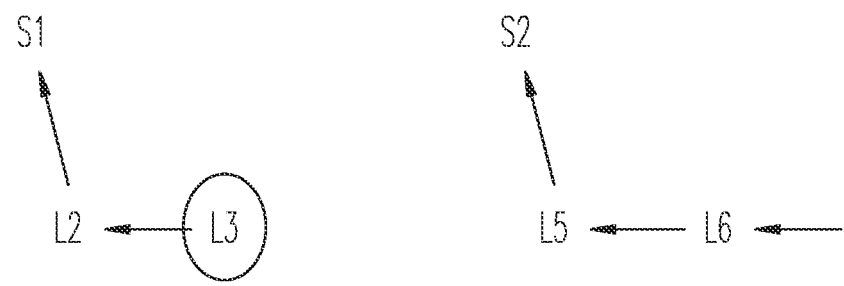

Some example embodiments include GC logs. A GC operation cleans out the logs if the references are empty. An empty reference implies that the log has expired, no other logs depend on it, and no live jobs are using it. So, it may be inferred that it is perform GC on these logs. With reference to FIG. 19, a per node operation 1900 will be scheduled periodically to perform GC on the logs. In some examples, the GC operation addresses, firstly, removal of the log reference from the base log and the base snapshot if these exist. Secondly, removing log metadata where stored in a database and, thirdly, removing the log file from disk. After the GC operation is complete, the log chain may appear like the example log chain 2000 in FIG. 20. Now L3 has no reference on it, so it will be recycled in the next execution of a GC operation.

Figure 21:
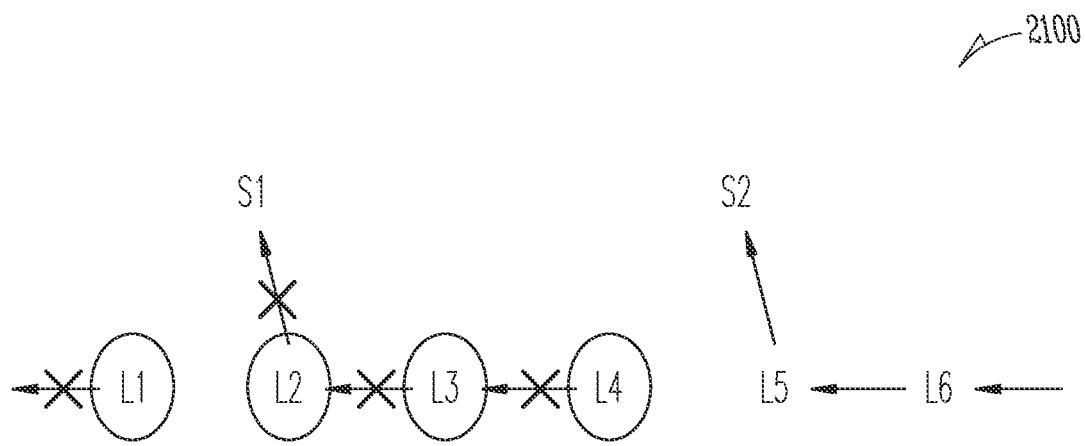
Figure 22:
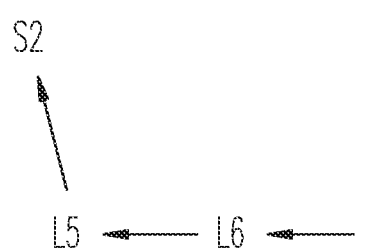

Some examples include an enhanced algorithm to promote an efficiency of the GC operation. In the above examples, once L4 has been GC'd and the LogRef has been removed from its base log, L3 becomes eligible for GC immediately. Aggressive GC tries to garbage collect as many logs as possible during one job execution, for example as shown at 2100 in FIG. 21. So, with aggressive GC, after one GC job execution, the log chain may appear like the example log chain 2200 in FIG. 22. All expired logs will be garbage collected during the first execution of the GC operation assuming the logs are not being pinned for recovery during GC In some examples, CDP enables near-continuous data protection of VMware VMs using a VAIO framework from VMware. A VAIO filter is implemented to replicate each I/O to a cluster. In some examples, these I/Os are written into a new file format called TimestampedJournal (TSJ) which supports point-in-time recovery for VMs. A log management component manages I/O stream logs, including log lifecycle management, log chain management, and so forth.

In some cases, a log chain may become very long. For example, if a snapshot frequency is much longer than log retention, instances may arise where many logs expire, but the expired logs cannot be GC'd because of dependent logs. If the protected VM is extremely I/O intensive and the change rate is fairly high, logs may be rolled over frequently, and excessive logs may be generated. In any case, applying too many logs during mount or recovery may take more time and may not meet a user's expectation of RTO.

In space saving applications, TSJs mat take more space than patch files as they are not optimized for overwrites. Maintaining a long chain of logs may also occupy more space. Some examples thus consolidate, and garbage collect (GC) logs out of the applicable retention window as soon as possible to improve recovery times and save space as well. Even for logs within the retention window, some examples still consolidate these even though space saving options are impacted because the TSJs are retained to support a granularity of point-in-time recoveries.

A CDP-enabled VM may include two ingestion paths: continuous stream logs and discrete snapshots. Some examples ingest all the requisite data from stream logs and may avoid taking snapshots. In some examples, once a VM is enabled for protection by CDP, unnecessary (if any) snapshots are taken and instead some examples automatically constructing snapshots by converting TSJs to patch files. The use of patch files or taking snapshots by an external source may reduce work, allow computation to happen in a datacenter, but may increase network bandwidth yet ensure application consistency. Constructing snapshots in a backup site may involve extra non-trivial work, allow computation to happen in a cluster, may decrease consumption of network bandwidth, yet there may be little or no application consistency. While dual ingestion may not present a big issue for backup because it is usually done within a data center, this can present an issue for replication. Replication traffic communicated over the internet (or VPN pipes) may have bandwidth limitations. Avoiding dual transfer may thus be very convenient for users. Thus, some examples make a distinction between content (the data being stored, like a complete snapshot) and representation (how the content is stored in the chain, likely spread among multiple patches).

Figure 23:
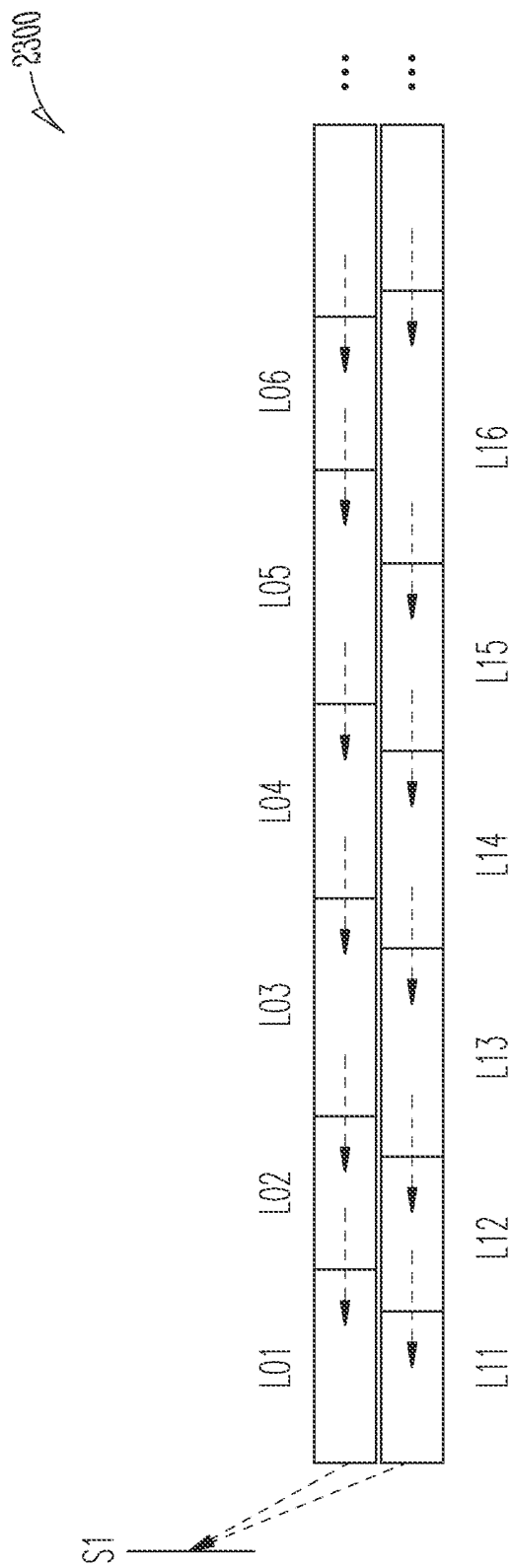

With reference to FIG. 23, a log chain 2300 is based on two stream sources (i.e. virtual disks) of one VM. If a log chain is dependent on a base snapshot it may become very long, the number of logs to be replayed during recovery will be increasing over time and a log replayer will take more and more time to replay all the TSJs. To address these challenges, two options may be possible. IN a first option, a significant issue may be the need to replay many TSJs. To address this issue, some examples periodically scan the log chain 2300. If it becomes excessively long (based on a threshold for example), the examples consolidate the logs by converting TSJs to patch files. Multiple patch files are generated for a long log chain. A log store may keep track of both original TSJs and the converted patch files. Some examples only use the most recent unconverted TSJs along with the converted patch files during mount or recovery.

Figure 24:
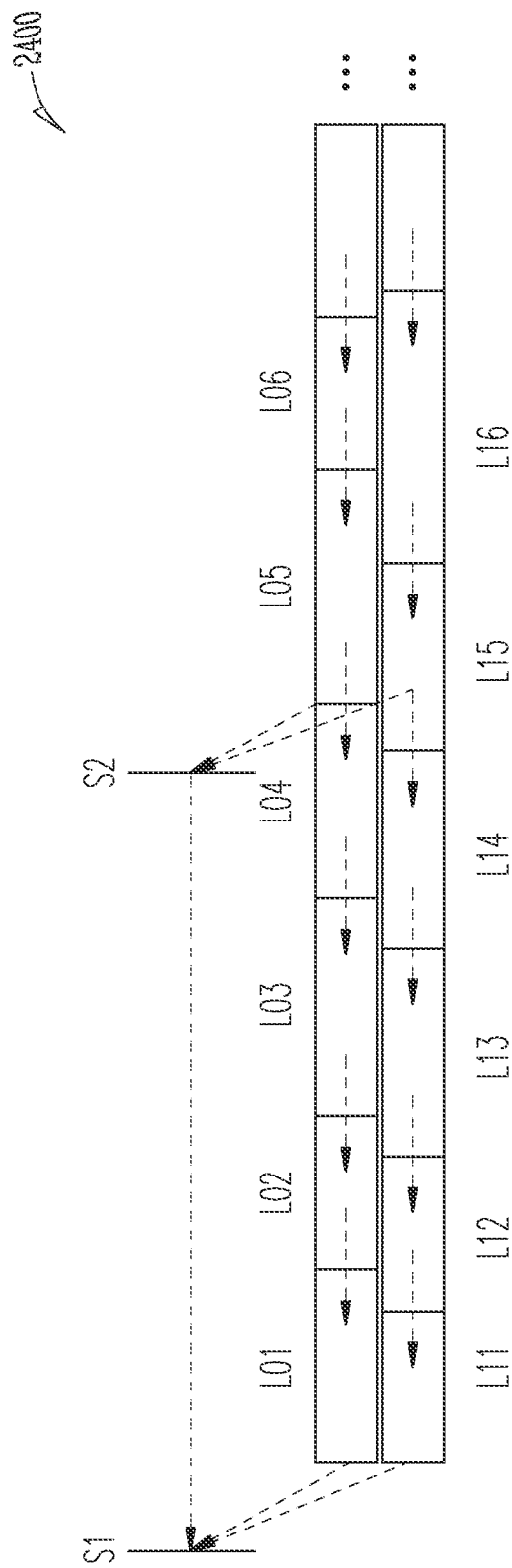

A second option includes periodically scan the log chain 2300 and converting TSJs to patch files on demand. However, instead of tracking the converted patch files, some examples construct a new snapshot from the converted patch files. This snapshot is added as a new base on the log chains, for example as shown in log chain 2400 in FIG. 24. Snapshot S2 is created as an incremental patch depending on S1. In some examples, the next ingested snapshot (S3) is created based on S2. If that is not possible, both S2 and S3 will be based on S1. The chain 2400 will get diverged and become a differential tree.

Some examples perform log consolidation using a ConsolidateStreamLogs operation which is run per VM and in some examples it includes two sub tasks. A first task includes a preparation operation. This operation determines tail logs for each stream source. A tail log is one in which no other logs depend on it. The log chains (one chain for each stream source) are traversed backward until a common base snapshot is found. A total size is calculated for all log chains from the tail log to the common base snapshot (these are the sub chains that will be used for recovery). If the total size reaches a predefined threshold, the visited logs to be consolidated are saved. The total size is reset, and the preparation operation is repeated from new base snapshot. The preparation process is terminated if it reaches the head of any log chains.

The first task may also include a stream consolidation operation. This operation, for each stream source, creates an incremental patch based on the current base snapshot, and calls a log converter API to convert the stream logs collected by the preparation operation to the new patch file. For the VM, a new snapshot is created from the patch files generated from above operations. The constructed snapshot is added as a new base snapshot on the log chains for the given VM.

Figure 25:
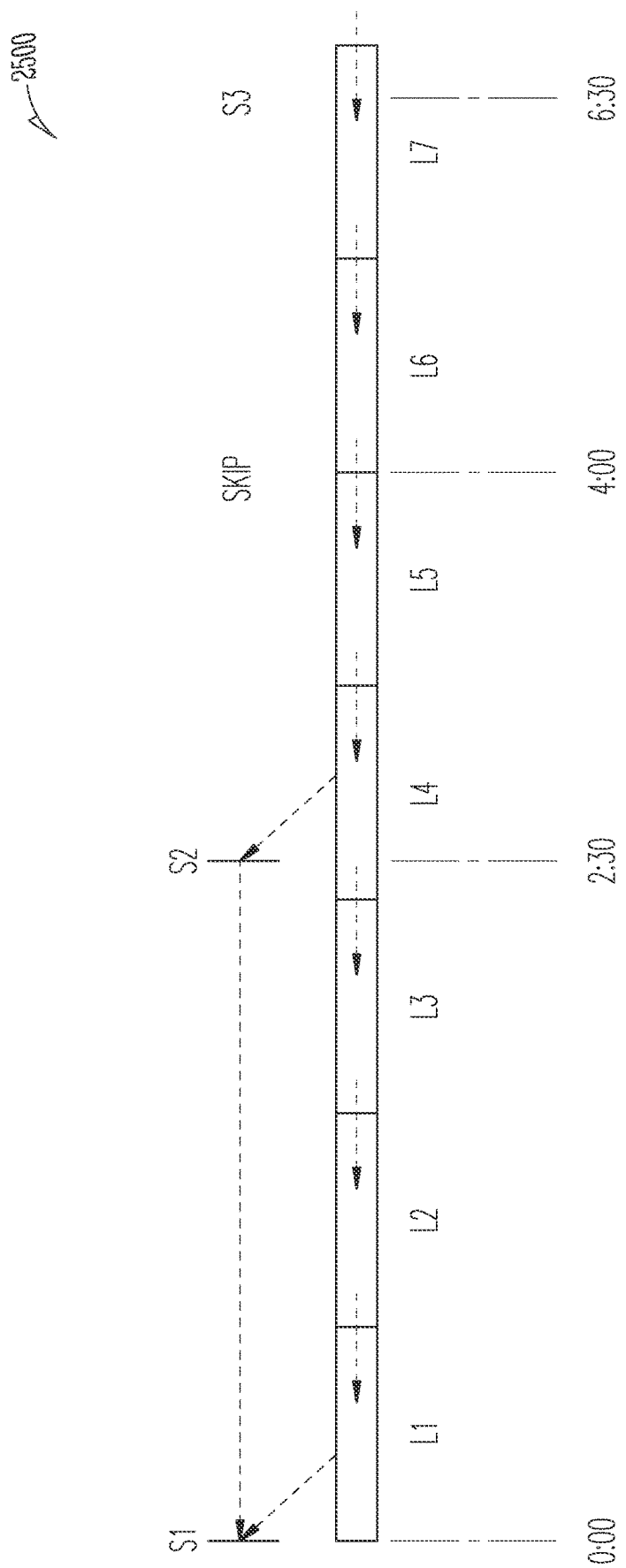

In a second task for avoiding dual ingestion, an existing snapshot ingestion path is disabled, and some examples rely solely on a CDP log stream ingestion path. In some examples, the consolidation operation is enhanced to take the snapshot SLA into account as well. A consolidation operation is scheduled more frequently than or at least equal to an SLA-defined snapshot frequency. Log chains are consolidated and converted to snapshots before the log chain becomes too long. In this case, at lower frequencies, an SLA obligation can be met accordingly. If an SLA snapshot frequency is higher, log consolidation may occur before the SLA obligation is due, for example as shown in the example log chain 2500 in FIG. 25. In this case, SLA is defined to take a snapshot every 4 hours. However, because there are excessive logs (based on a threshold for example), the consolidation operation has constructed a new snapshot S2 at time 2:30. In this event, one option is to skip the snapshot operation scheduled at 4:00 and defer (or reschedule) it to 6:30. An appropriate API may be provided to support conversion of TSJs to a patch file.

Figure 26:
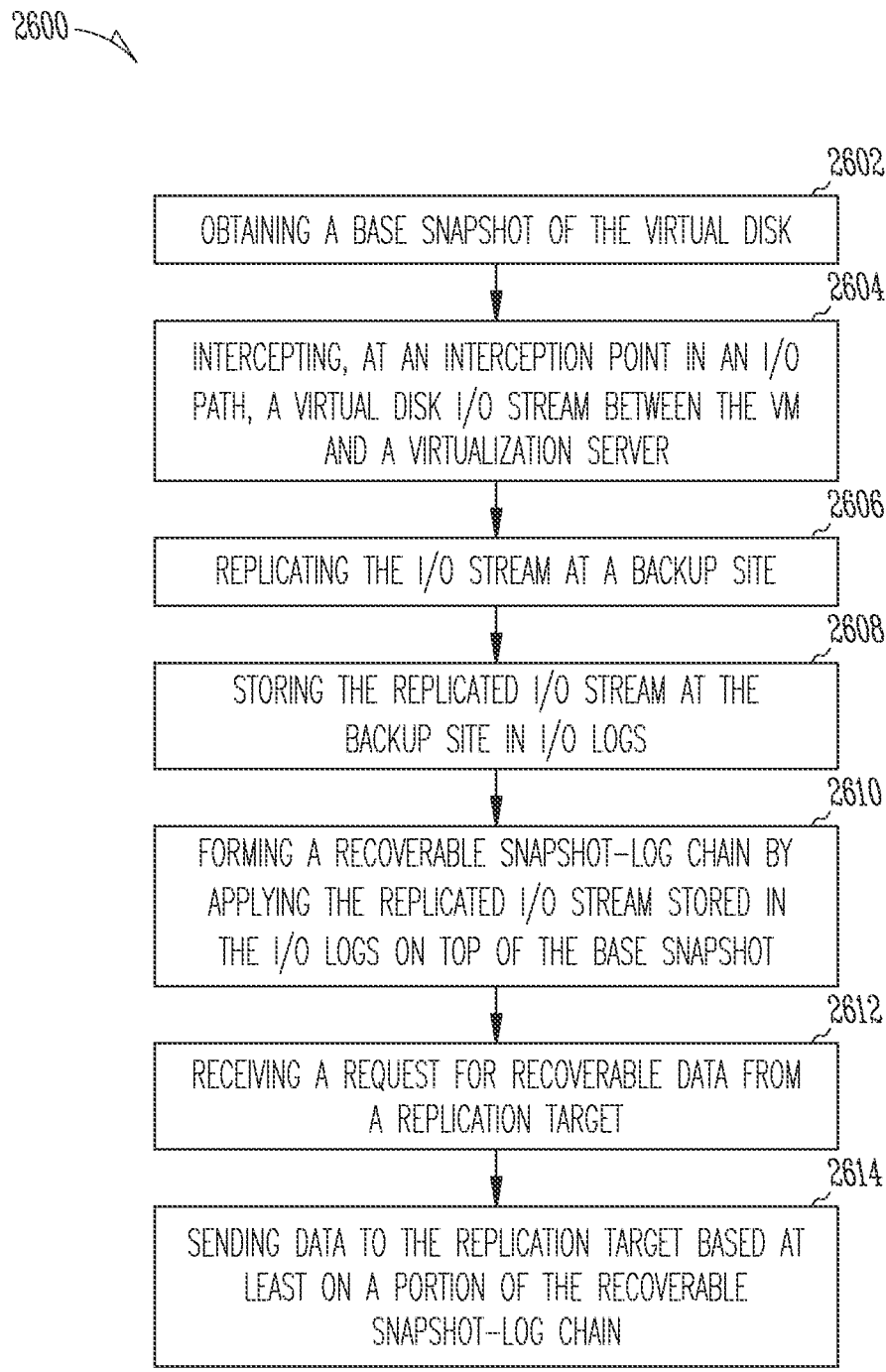
FIGS. 26-31 and 35-38 are flow charts depicting example operations in methods, according to example embodiments.

Thus, some examples of the present disclosure include method embodiments. With reference to FIG. 26, an example method 2600 for continuous data protection for a virtual machine (VM) having a virtual disk comprises at least the following operations: at 2602, obtaining a base snapshot of the virtual disk; at 2604, intercepting, at an interception point in an I/O path, a virtual disk I/O stream between the VM and a virtualization server; at 2606, replicating the I/O stream at a backup site; at 2608, storing the replicated I/O stream at the backup site in I/O logs; at 2610, forming a recoverable snapshot-log chain by applying the replicated I/O stream stored in the I/O logs on top of the base snapshot; at 2612, receiving a request for recoverable data from a replication target; and at 2614, sending data to the replication target based at least on a portion of the recoverable snapshot-log chain.

The operations in method 2600 may further comprise establishing a filter framework at the interception point, the filter framework including an I/O stack and an I/O filter. The virtualization server may be an ESX hypervisor server and the operations may further comprise including a filter driver for the filter framework within the ESX hypervisor server. The operations may further comprise configuring the filter framework to enable an I/O touch point in the I/O stream. The I/O stream may include an I/O cancellation and the operations further comprise configuring the filter driver to intercept only completed I/Os in the I/O stream using the enabled I/O touch point. The I/O cancellation may be a distributed I/O cancellation and the operations may further comprise managing the distributed I/O cancellation at the I/O stack and not at the I/O filter of the filter framework.

Figure 27:
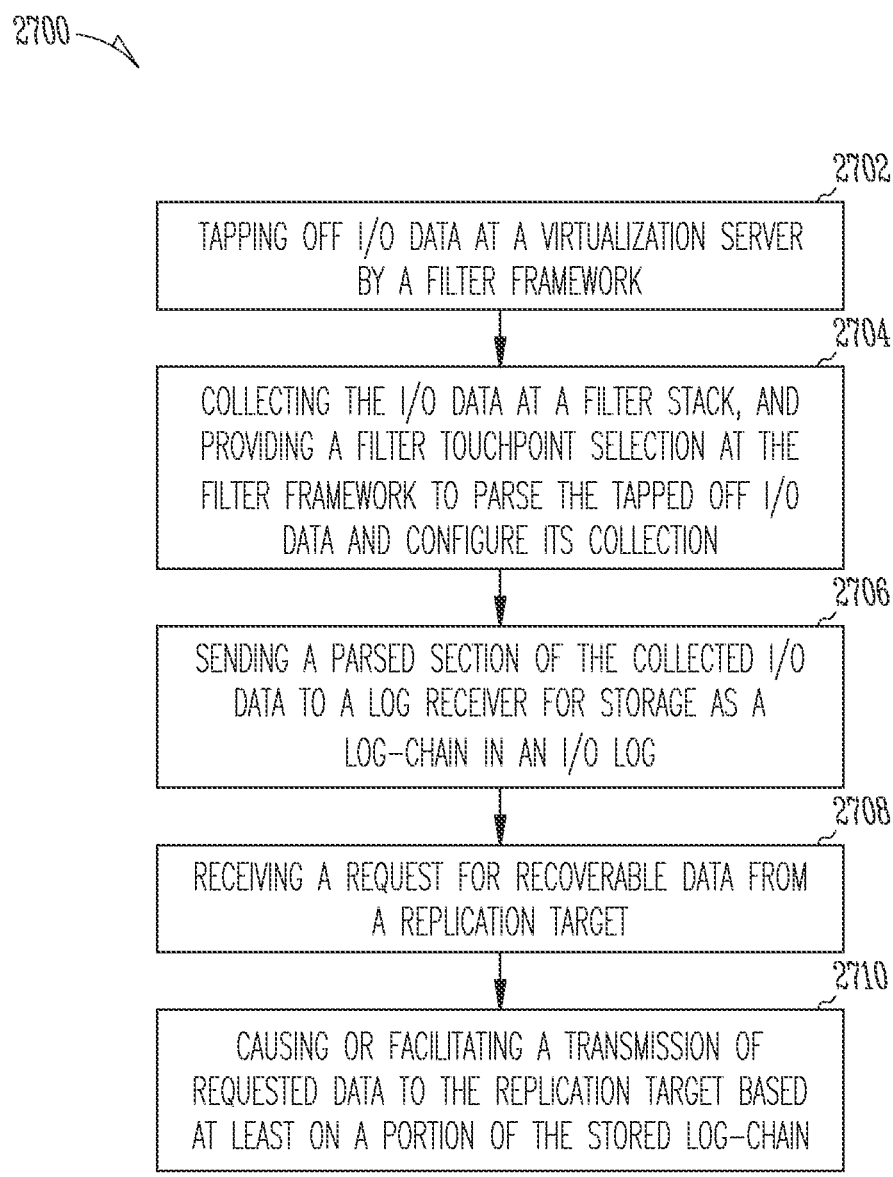

With reference to FIG. 27, an example method 2700 is provided for optimizing a recovery point objective (RPO) in a virtual machine (VM) having a virtual disk. The method 2700 may comprise at least the following operations: at 2702, tapping off I/O data at a virtualization server by a filter framework; at 2704, collecting the I/O data at a filter stack, and providing a filter touchpoint selection at the filter framework to parse the tapped off I/O data and configure its collection; at 2706, sending a parsed section of the collected I/O data to a log receiver for storage as a log-chain in an I/O log; at 2708, receiving a request for recoverable data from a replication target; and at 2710, causing or facilitating a transmission of requested data to the replication target based at least on a portion of the stored log-chain.

The parsed section of the I/O data may include only completed I/O requests exchanged between the VM and the virtualization server. The parsed section of the I/O data may exclude cancelled I/O requests exchanged between the VM and the virtualization server. The operations of method 2700 may further comprise forming a recoverable snapshot-log chain by applying the log-chain to a base snapshot of the virtual disk. The operations may further comprise establishing a network cache for the parsed section of the collected I/O data between the filter framework and the log receiver. The operations may further comprise establishing a cache for the parsed section of the collected I/O data at the log receiver.

Figure 28:
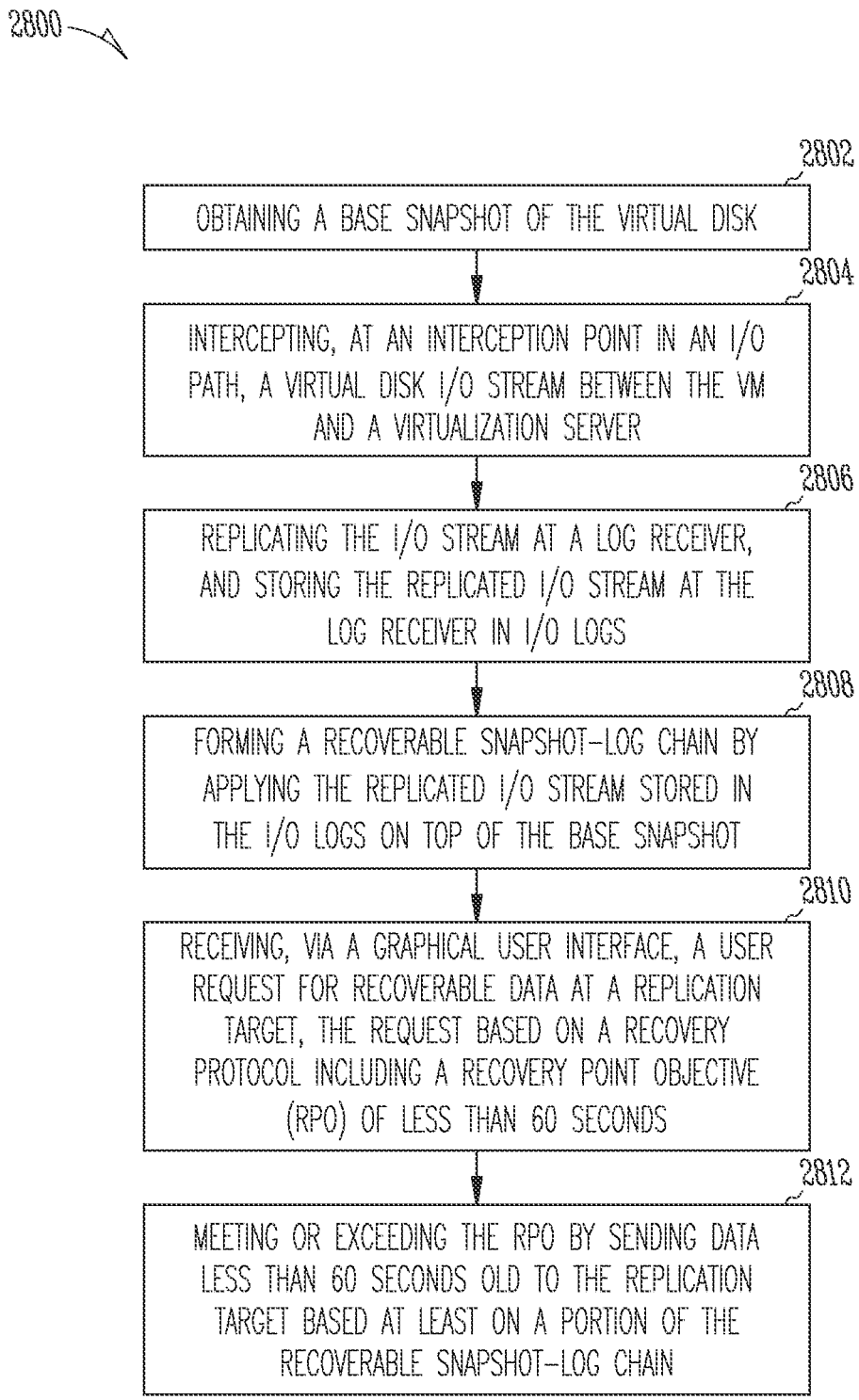

With reference to FIG. 28, an example method 2800 is provided for continuous data protection for a virtual machine (VM) having a virtual disk. The method 2800 may comprise at least the following operations: at 2802, obtaining a base snapshot of the virtual disk; at 2804, intercepting, at an interception point in an I/O path, a virtual disk I/O stream between the VM and a virtualization server; at 2806, replicating the I/O stream at a log receiver, and storing the replicated I/O stream at the log receiver in I/O logs; at 2808, forming a recoverable snapshot-log chain by applying the replicated I/O stream stored in the I/O logs on top of the base snapshot; at 2810, receiving, via a graphical user interface, a user request for recoverable data at a replication target, the request based on a recovery protocol including a recovery point objective (RPO) of less than 60 seconds; and at 2812, meeting or exceeding the RPO by sending data less than 60 seconds old to the replication target based at least on a portion of the recoverable snapshot-log chain.

The operations may further comprise establishing a filter framework at the interception point, the filter framework including an I/O stack and an I/O filter. The virtualization server may be an ESX hypervisor server and the operations may further comprise including a filter driver for the filter framework within the ESX hypervisor server. The operations may further comprise configuring the filter framework to enable an I/O touch point in the I/O stream. The I/O stream may include an I/O cancellation and the operations may further comprise configuring the filter driver to intercept only completed I/Os in the I/O stream using the enabled I/O touch point. The I/O cancellation may be a distributed I/O cancellation and the operations may further comprise managing the distributed I/O cancellation at the I/O stack and not at the I/O filter of the filter framework.

Figure 29:
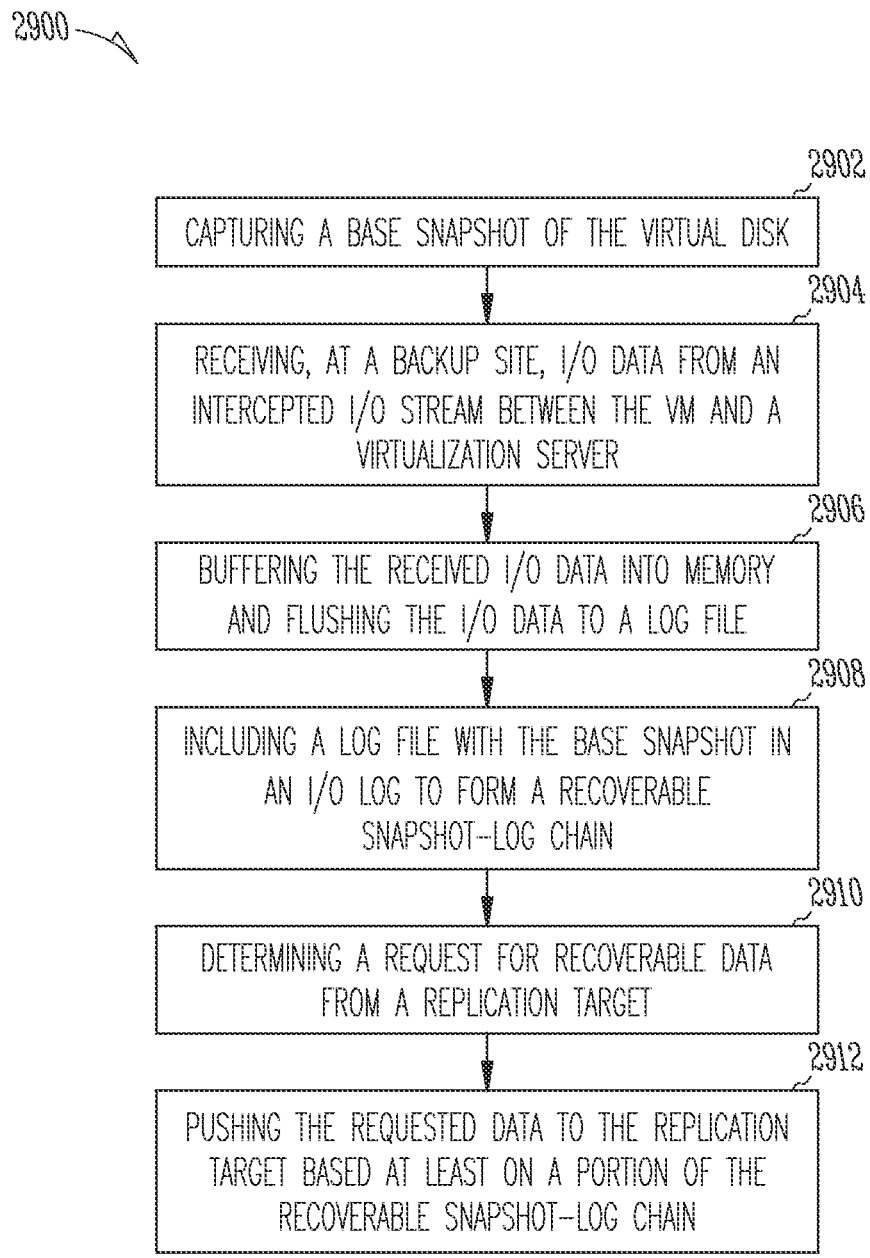

With reference to FIG. 29, an example method 2900 is provided for continuous data protection for a virtual machine (VM) having a virtual disk. The method 2900 may comprise at least the following operations: at 2902, capturing a base snapshot of the virtual disk; at 2904, receiving, at a backup site, I/O data from an intercepted I/O stream between the VM and a virtualization server; at 2906, buffering the received I/O data into memory and flushing the I/O data to a log file; at 2908, including a log file with the base snapshot in an I/O log to form a recoverable snapshot-log chain; at 2910, determining a request for recoverable data from a replication target; and at 2912, pushing the requested data to the replication target based at least on a portion of the recoverable snapshot-log chain.

The operations may further comprise establishing an instance of a log replication sender at the backup site to communicate with a log replication receiver at the replication target. The operations may further comprise configuring the log replication receiver at the replication target to run at an unmodified existing snapshot recovery service. The operations may further comprise configuring a CDP metadata service to communicate with the log replication sender and the log replication receiver. The operations may further comprise configuring the log replication sender to identify a log file to be replicated and, based on the identified log file including a closed file, including the contents of the log file in a closed replication. The operations may further comprise configuring the log replication sender to identify a log file to be replicated and, based on the identified log file including an open file receiving I/O data from the intercepted I/O stream, including the I/O data in a live replication.

Figure 30:
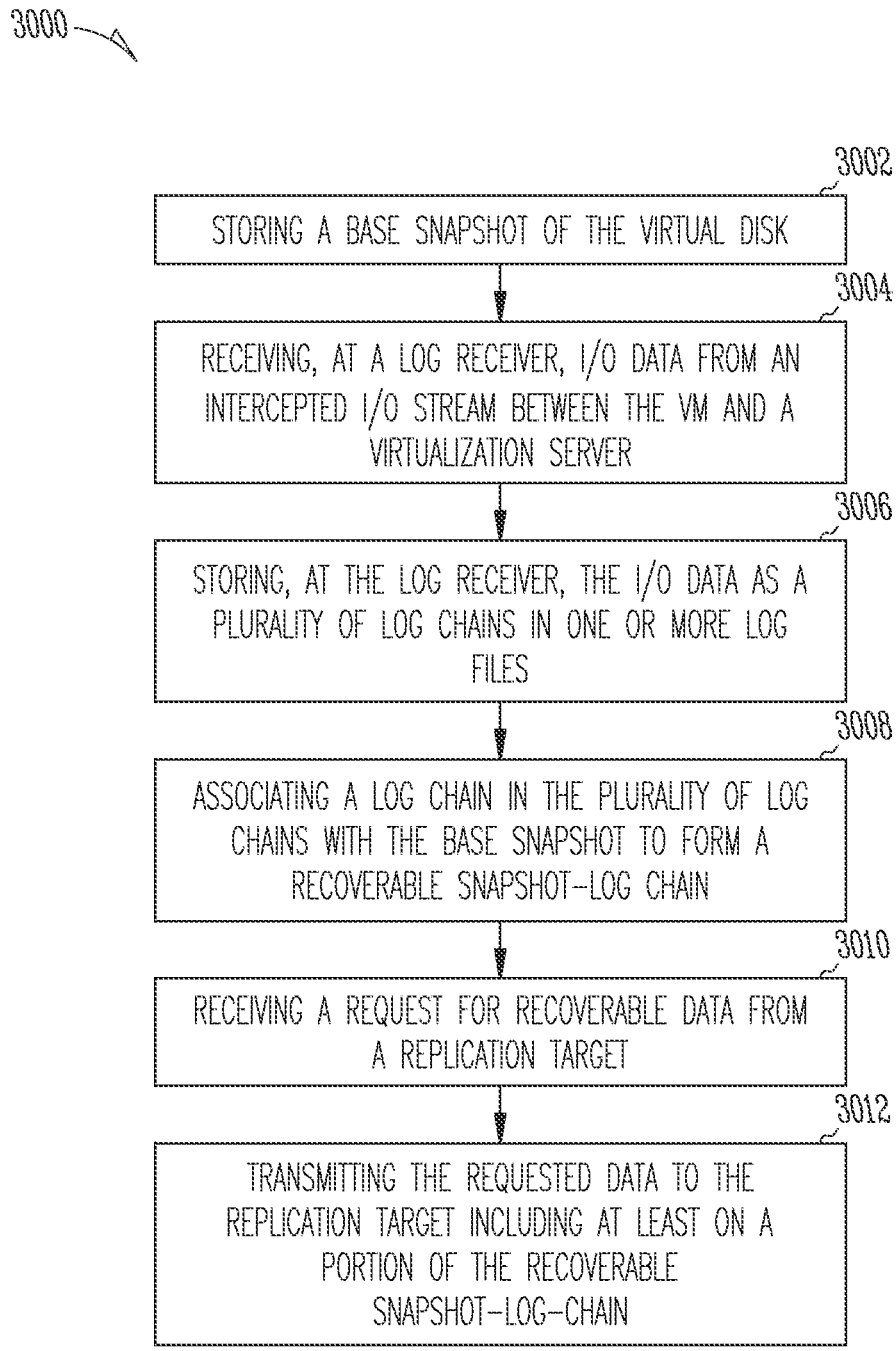

With reference to FIG. 30, an example method 3000 is provided for optimizing a recovery point objective (RPO) for a virtual machine (VM) having a virtual disk. The method may comprise at least the following operations: at 3002, storing a base snapshot of the virtual disk; at 3004, receiving, at a log receiver, I/O data from an intercepted I/O stream between the VM and a virtualization server; at 3006, storing, at the log receiver, the I/O data as a plurality of log chains in one or more log files; at 3008, associating a log chain in the plurality of log chains with the base snapshot to form a recoverable snapshot-log chain; at 3010, receiving a request for recoverable data from a replication target; and at 3012, transmitting the requested data to the replication target including at least on a portion of the recoverable snapshot-log chain.

The operations may further comprise establishing an instance of a log replication sender at the log receiver to communicate with a log replication receiver at the replication target. The operations may further comprise configuring the log replication receiver at the replication target to run at an unmodified existing snapshot recovery service. The operations may further comprise configuring a CDP metadata service to communicate with the log replication sender and the log replication receiver. The operations may further comprise configuring the log replication sender to identify a log file to be replicated and, based on the identified log file including a closed file, including the contents of the log file in a closed replication. The operations may further comprise configuring the log replication sender to identify a log file to be replicated and, based on the identified log file including an open file receiving I/O data, including the I/O data in a live replication.

Figure 31:
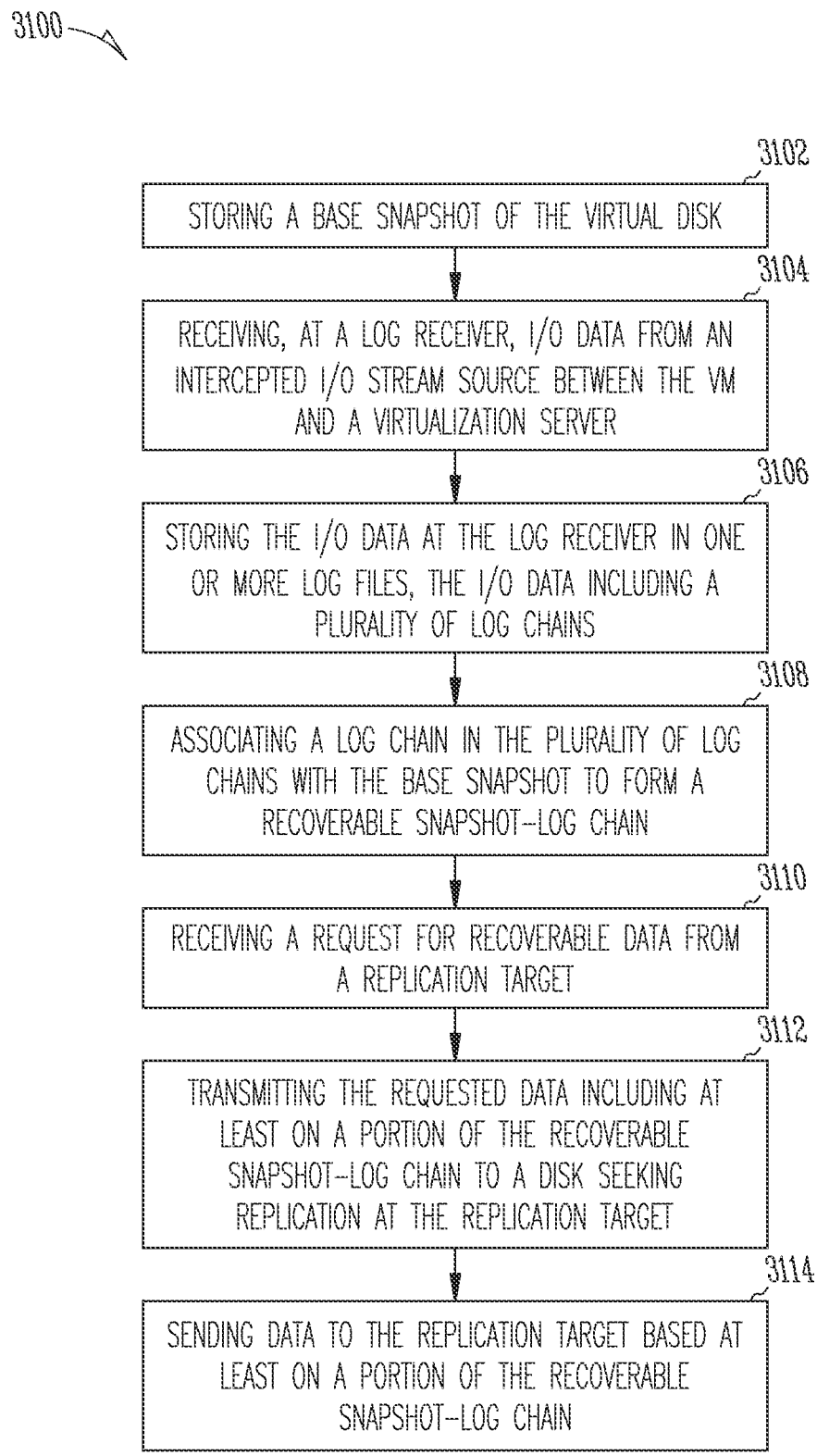

With reference to FIG. 31, an example method 3100 is provided for optimizing a recovery point objective (RPO) for a virtual machine (VM) having a virtual disk. The method 3100 may comprise at least the following operations: at 3102, storing a base snapshot of the virtual disk; at 3104, receiving, at a log receiver, I/O data from an intercepted I/O stream source between the VM and a virtualization server; at 3106, storing the I/O data at the log receiver in one or more log files, the I/O data including a plurality of log chains; at 3108, associating a log chain in the plurality of log chains with the base snapshot to form a recoverable snapshot-log chain; at 3110, receiving a request for recoverable data from a replication target; and at 3112, transmitting the requested data including at least on a portion of the recoverable snapshot-log chain to a disk seeking replication at the replication target.

The operations may further comprise establishing a continuous data protection (CDP) metadata service in communication with the log receiver to scan disks seeking replication periodically to determine and assign a replication owner node for the disk seeking replication at the replication target. The operations further comprise assigning a worker pool to process each disk seeking replication from the replication owner node. The operations may further comprise configuring the CDP metadata service to communicate with a log replication sender at the log receiver, and a log replication receiver at the replication target. The operations may further comprise configuring a CDP replication orchestrator to identify the I/O stream source from a plurality of I/O stream sources and identify replication metadata including an owner node identification and a claim time. The operations may further comprise configuring the CDP replication orchestrator to identify a next log chain to replicate in a snapshot-log chain replication.

Figure 35:
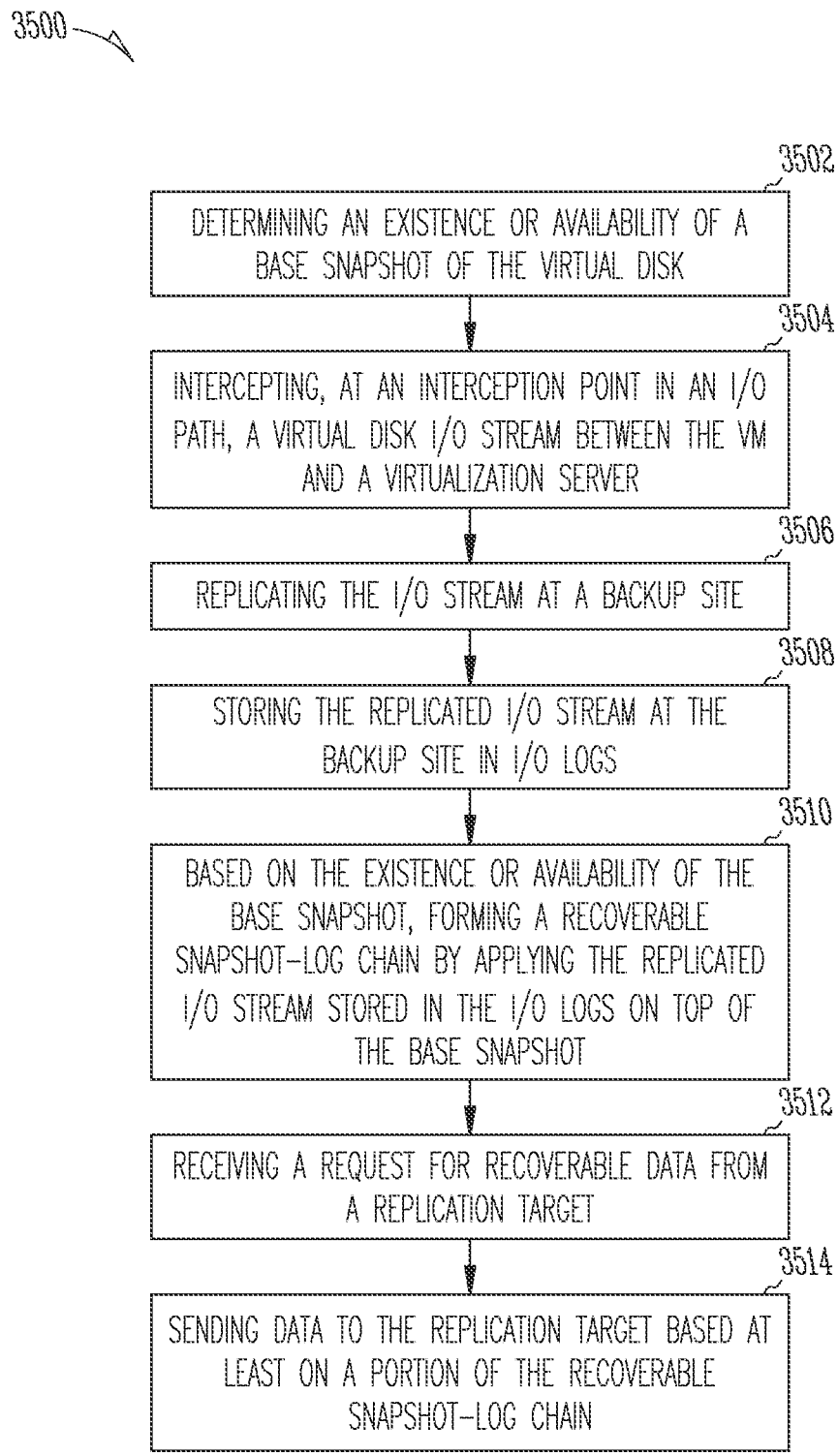

With reference to FIG. 35, an example method 3500 is provided for continuous data protection for a virtual machine (VM) having a virtual disk, the method comprising at least the following operations: at 3502, determining an existence or availability of a base snapshot of the virtual disk; at 3504, intercepting, at an interception point in an I/O path, a virtual disk I/O stream between the VM and a virtualization server; at 3506, replicating the I/O stream at a backup site; at 3508, storing the replicated I/O stream at the backup site in I/O logs; at 3510, based on the existence or availability of the base snapshot, forming a recoverable snapshot-log chain by applying the replicated I/O stream stored in the I/O logs on top of the base snapshot; at 3512, receiving a request for recoverable data from a replication target; and at 3514, sending data to the replication target based at least on a portion of the recoverable snapshot-log chain.

Figure 36:
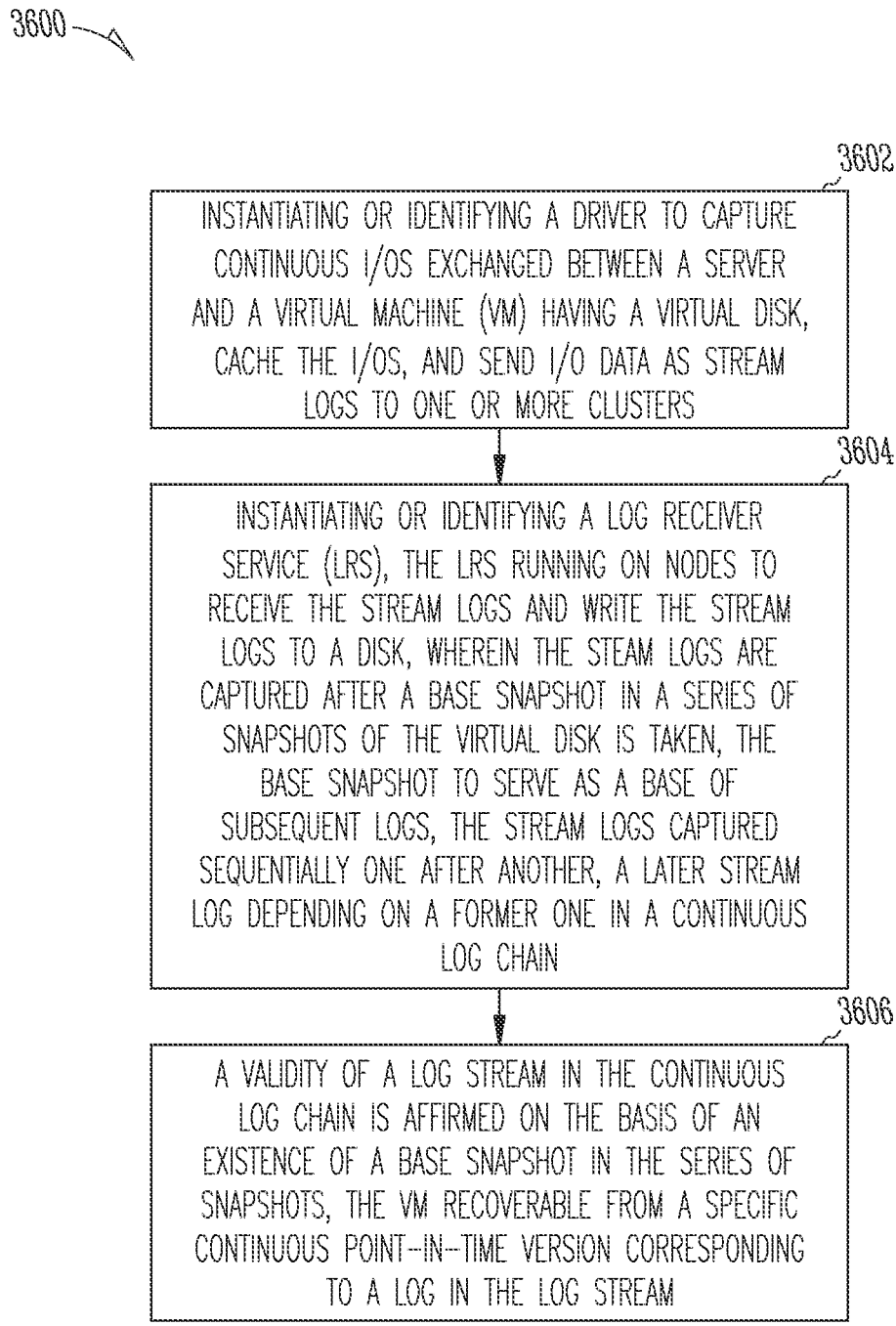

With reference to FIG. 36, an example method 3600 is provided for establishing a system for continuous data protection, the method including operations comprising, at least: at 3602, instantiating or identifying a driver to capture continuous I/Os exchanged between a server and a virtual machine (VM) having a virtual disk, cache the I/Os, and send I/O data as stream logs to one or more clusters; at 3604, instantiating or identifying a log receiver service (LRS), the LRS running on nodes to receive the stream logs and write the stream logs to a disk, wherein the steam logs are captured after a base snapshot in a series of snapshots of the virtual disk is taken, the base snapshot to serve as a base of subsequent logs, the stream logs captured sequentially one after another, a later stream log depending on a former one in a continuous log chain; and wherein, at 3606, a validity of a log stream in the continuous log chain is affirmed on the basis of an existence of a base snapshot in the series of snapshots, the VM recoverable from a specific continuous point-in-time version corresponding to a log in the log stream.

Figure 37:
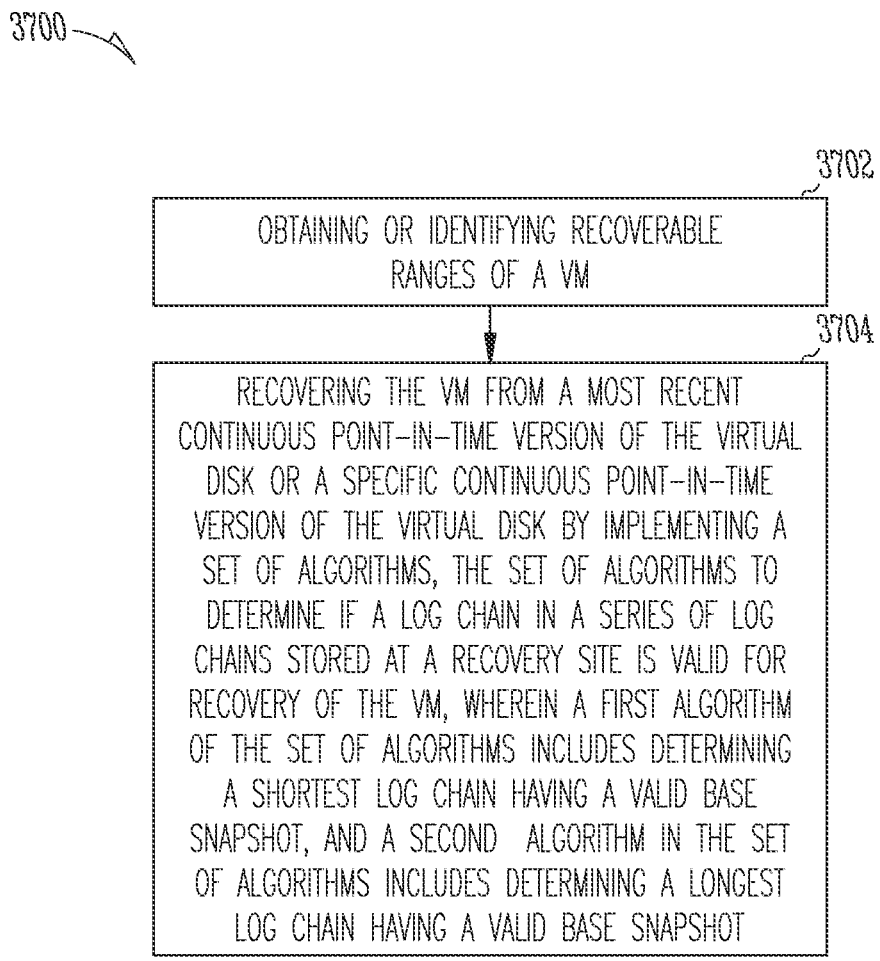

With reference to FIG. 37, an example method 3700 is provided for continuous data protection for a virtual machine (VM) having a virtual disk, the method comprising at least the following operations: at 3702, obtaining or identifying recoverable ranges of a VM; and at 3704, recovering the VM from a most recent continuous point-in-time version of the virtual disk or a specific continuous point-in-time version of the virtual disk by implementing a set of algorithms, the set of algorithms to determine if a log chain in a series of log chains stored at a recovery site is valid for recovery of the VM, wherein a first algorithm of the set of algorithms includes determining a shortest log chain having a valid base snapshot, and a second algorithm in the set of algorithms includes determining a longest log chain having a valid base snapshot.

Figure 38:
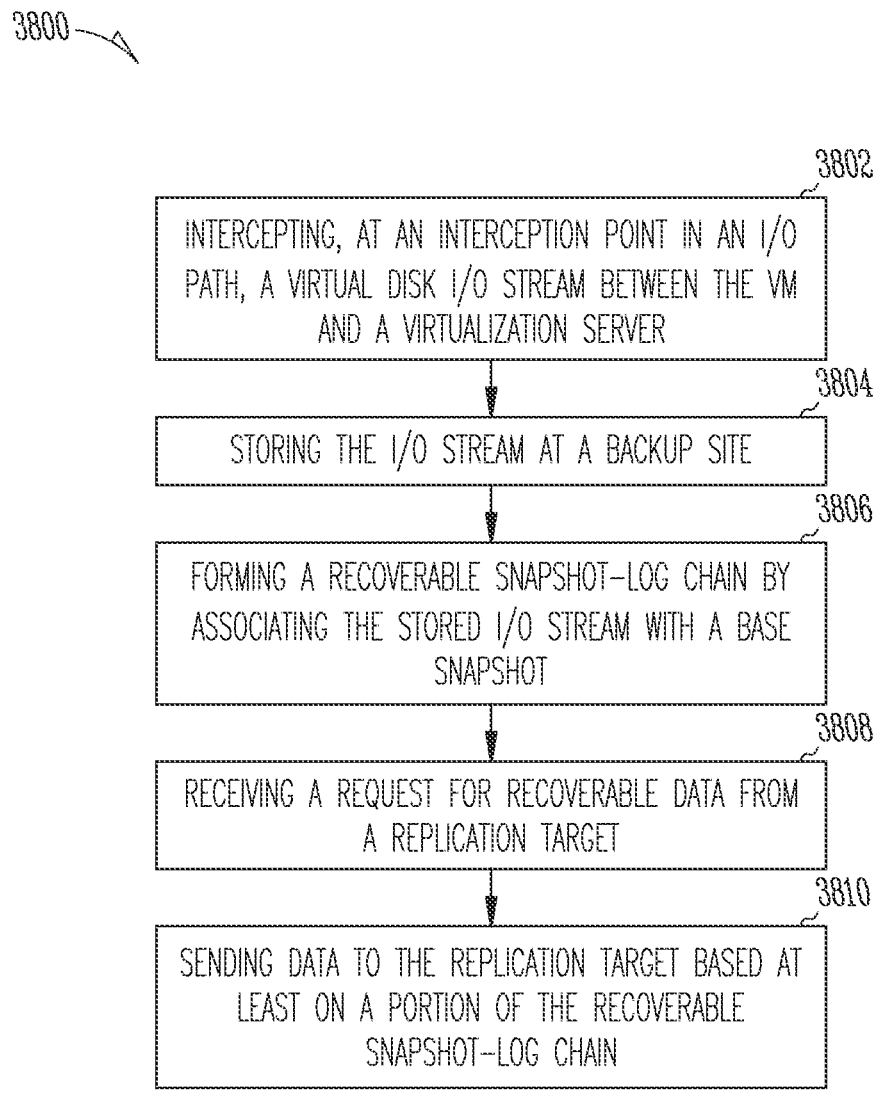

With reference to FIG. 38, an example method 3800 is provided for continuous data protection for a virtual machine (VM) having a virtual disk, the method comprising at least the following operations: at 3802, intercepting, at an interception point in an I/O path, a virtual disk I/O stream between the VM and a virtualization server; at 3804, storing the I/O stream at a backup site; at 3806, forming a recoverable snapshot-log chain by associating the stored I/O stream with a base snapshot; at 3808, receiving a request for recoverable data from a replication target; and, at 3810, sending data to the replication target based at least on a portion of the recoverable snapshot-log chain.

Some example embodiments include systems as summarized further above, or specifically described herein, that include processors configured to perform one or more of the method operations summarized or described herein. Some example embodiments also include non-transitory machine-readable media that include instructions for performing one or more of the method operations summarized or described herein.

As mentioned above, as a real-time streaming backup system, a potential issue with some CDP systems is that they may become incapable of catching up with the IOs from a data source, for example a virtual disk. This situation is known as being "out of sync". Some examples include further technology, colloquially referred to as "CDP resync", to allow a recovery or resumption of CDP after interruption without requiring a snapshot. Some examples endow CDP systems with greater resiliency to recover a virtual machine (VM) from out of sync state with as little downtime as possible.

In some examples, an objective of a CDP resync is to avoid taking a new snapshot by quickly syncing up the entire persistence state of the source VM. The state of the VM is rapidly transferred over a high speed network from one physical server to another. Resync only replicates the persistence state of the VM. In some examples, other states such as active memory, network state and precise execution state are not relevant to CDP. In some examples, the resync process is independent between different disks. In some examples, a given disk may be in a "resync" state, while other disks of the same VM are still in normal "sync" state.

Some examples include two different communication modes: a "sync" mode and "resynch" mode. In some examples, an I/O filter (for example the I/O filter 810, FIG. 8) switches between these two modes. An example synch mode is a "normal" case in which the I/O filter 810 sends normal I/Os sequentially to a log receiver service (LRS), such as a log receiver service 1102 in FIG. 11. In this mode, I/O records are written to regular TSJ files with accurate timestamps. In the resync mode, the I/O filter 810 seeks to resync a disk state to the LRS. In this mode, the I/O filter 810 tracks on-going disk writes by maintaining a bitmap, marking dirty (changed) data blocks in the bitmap, and sending the corresponding block data to the LRS. This block data is written to a TSJ file with dummy timestamps.

Figure 39:
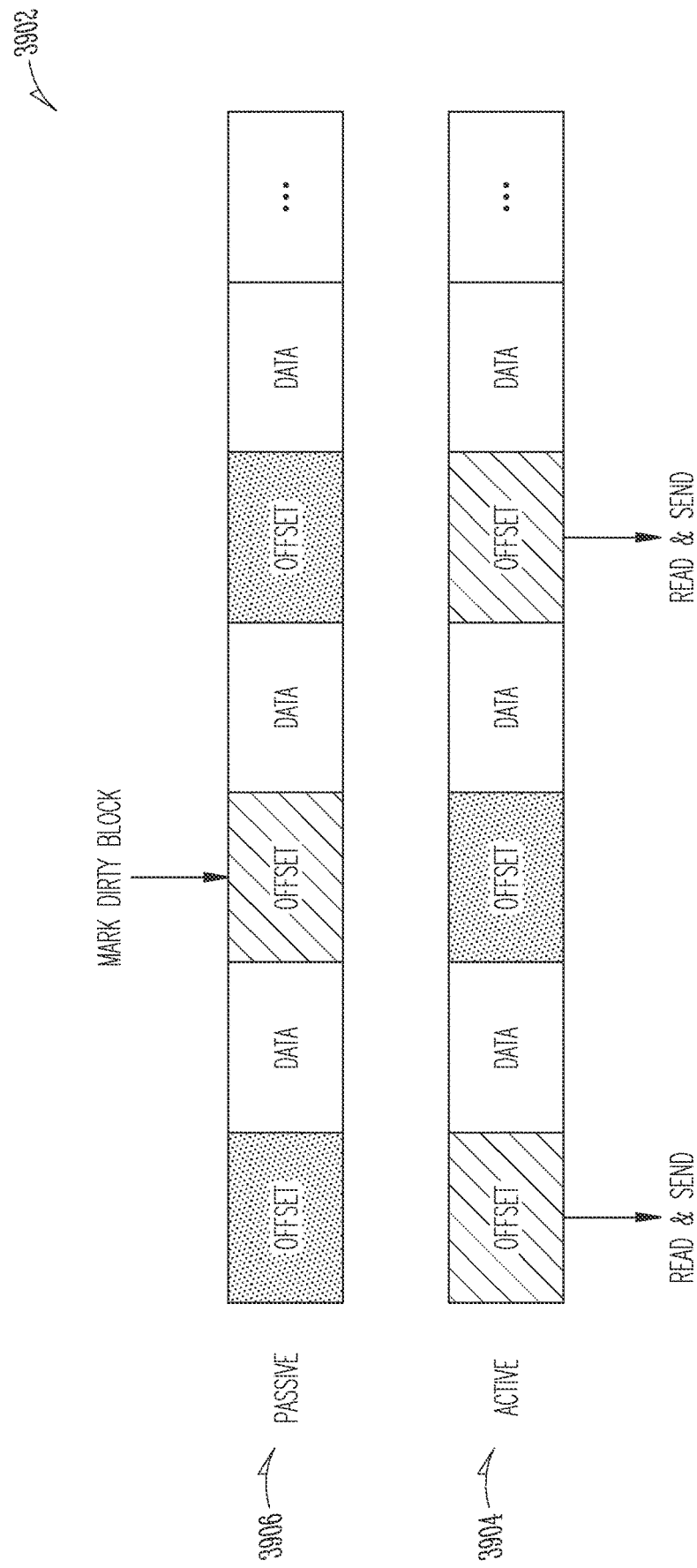
FIG. 39 illustrates operations in a process, according to an example embodiment.

In some examples, the I/O filter maintains two bitmap buffers for tracking dirty blocks. Some examples include an active and a passive buffer. Other numbers of buffers, or pairs of active and passive buffers, are possible in some examples. In some examples, their roles reverse as explained more fully below. An active buffer reads and sends the block data to the LRS. A passive buffer tracks the dirty blocks. An example operational process 3902 for active buffer 3904 and a passive buffer 3906 is shown in FIG. 39.

Once the active buffer 3904 is cleared (i.e. all dirty blocks are sent out), the role of two buffers 3904 and 3906 is switched at the same time: the active buffer becomes passive and tracks the dirty blocks, while the passive buffer becomes active and is used to send the block data. Whenever both buffers 3904 and 3906 are clean (i.e. no dirty blocks), which signifies the entire disk state is copied and "resynched", the I/O filter 810 performs, in some examples, the following operations to switch back to a "synch" state.

Figure 40:
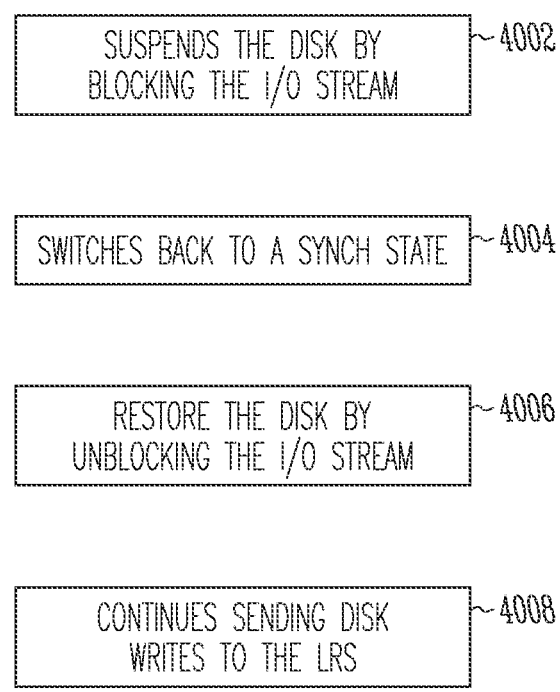
FIG. 40 illustrates example operations in a method, according to an example embodiment.

With reference to the example method operations shown in FIG. 40, at operation 4002, the I/O filter suspends the disk by blocking the I/O stream; at operation 4004, switches back to a synch state; at operation 4006, restores the disk by unblocking the I/O stream; and, at operation 4008, continues sending disk writes to the LRS. In some examples, the above active/passive state transition occurs in milliseconds, while the whole resync process for a specific disk may last for a short period from seconds to minutes.

Some examples include methods of data resynchronization in continuous data protection of a virtual machine (VM) having one or more virtual disks. An example method comprises at least the following operations: obtaining a base snapshot of the virtual disk; intercepting, at an interception point in an I/O path, a virtual disk I/O stream between the VM and a virtualization server; replicating the I/O stream at a backup site; in a synchronization mode, storing the replicated I/O stream at the backup site in I/O logs; forming a recoverable snapshot-log chain by applying the replicated I/O stream stored in the I/O logs on top of the base snapshot; based on an interruption or discontinuity in the I/O stream, in a resynchronization mode: maintaining a bitmap, marking dirty blocks in the bitmap, and sending corresponding dirty block data to a log receiver service to resynchronize a virtual disk state at the log receiver service; receiving a request for recoverable data from a replication target; and sending data to the replication target based at least on a portion of the recoverable snapshot-log chain.

In some examples, the operations further comprise establishing a filter framework at the interception point, the filter framework including an I/O stack and an I/O filter.

In some examples, the I/O filter maintains at least two bitmap buffers for tracking the dirty blocks.

In some examples, the at least two bitmap buffers include an active buffer and a passive buffer.

In some examples, the active buffer reads and sends the dirty block data to the log receiver service.

In some examples, the passive buffer tracks the dirty blocks.

In some examples, the active buffer and the passive buffer simultaneously switch roles based on a clearance of dirty blocks from the active buffer.

Figure 41:
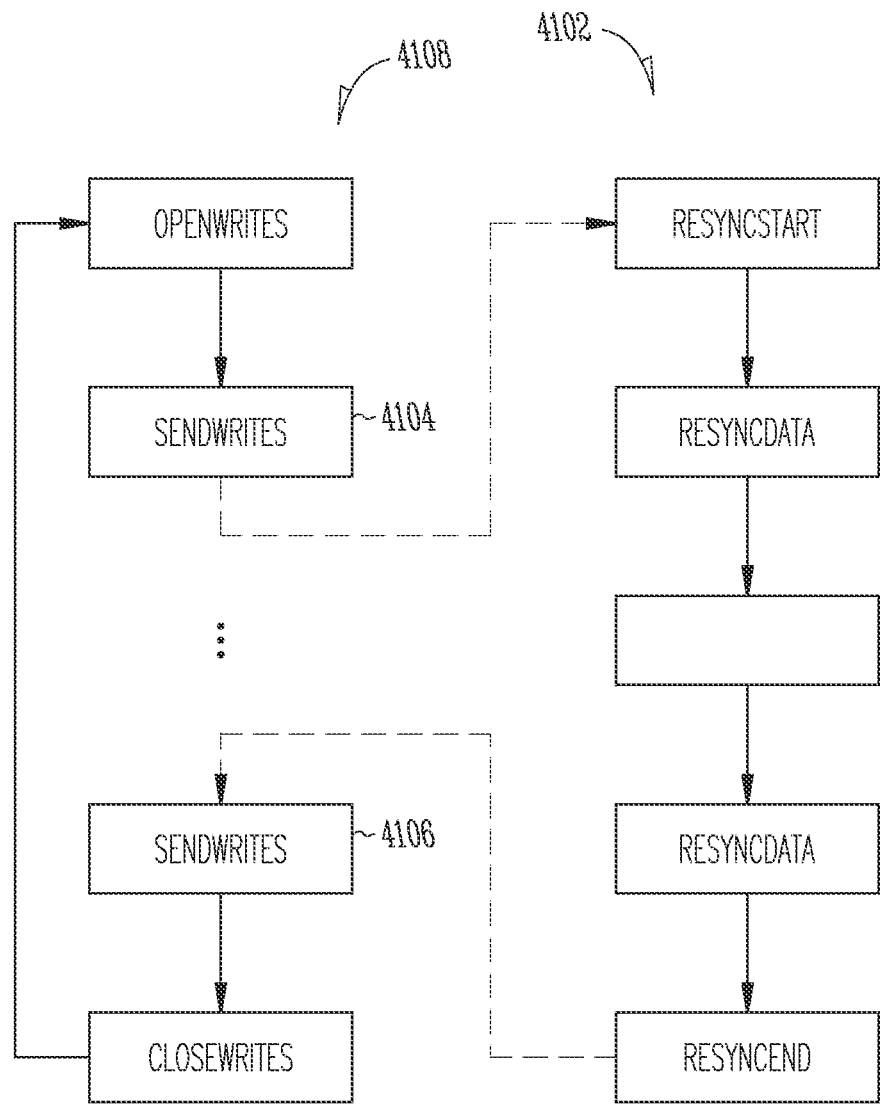
FIG. 41 illustrates aspects of a protocol, according to an example embodiment.

Some examples include a block data path workflow. In order to support a resync, some examples herein include one or more APIs into an existing block data path workflow. In an example, three such APIs are provided, including a resyncStart API, a resyncData API, and a resyncEnd API. IN some examples, these APIs support a communication protocol between an I/O filter and an LRS. An example protocol is illustrated in FIG. 41. In the illustrated example, the resync operations listed in column 4102 are interposed between sendwrite operations 4104 and 4106 in sync column 4108.

Figure 42:
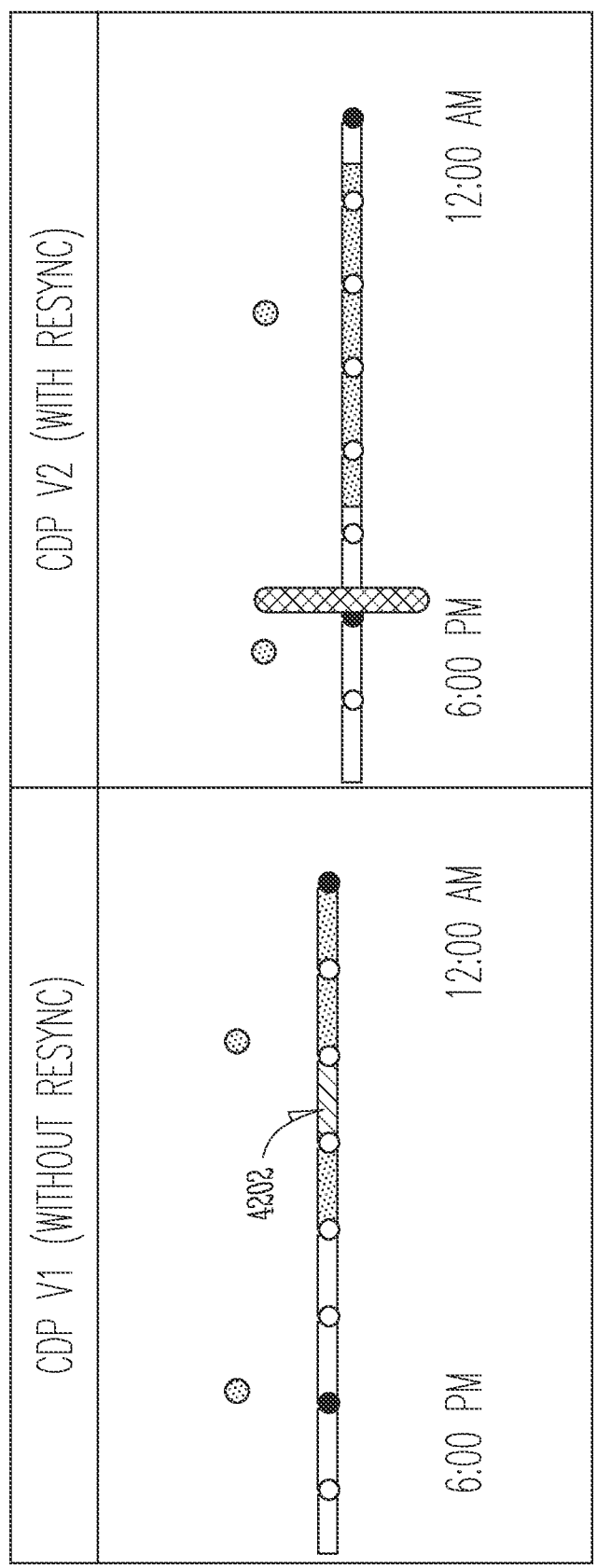
FIG. 42 shows aspects of an out-of-sync situation occurring with or without resync support, according to example embodiments.

In some examples of the resync technology disclosed herein, when a CDP operation gets out of sync, a user is relieved from waiting for an on-demand or scheduled snapshot to occur. CDP protection is automatically recovered. The diagrams in FIG. 42 show example differences when an out-of-sync situation occurs with or without resync support. In the "without resync" example, a discontinuity in (otherwise) continuous data protection appears at 4202 which "resync" examples of the present disclosure are able to resolve.

Some resync examples address challenges in implementation. For example, on the ESX side of an I/O filter a challenge can arise in keeping track of dirty block data. In some instances, there is very limited memory in the ESX kernel that can be used by the I/O filter for tracking dirty blocks and sending data. Some examples therefore include adaptive dirty block tracking based on the size of the virtual machine disk (VMDK). Other challenges include how to resync data while still supporting an ongoing I/O stream. Here, a number of resync I/Os may be throttled so as not to use all I/O bandwidth in view of a need to share this bandwidth with VMDK IOs. Further examples address challenges in convergence, for example identifying an optimum time to converge and how to converge without blocking I/Os. Some examples therefore include tight resync timing to ensure successful converge within milliseconds to avoid a potential impact of blocking IOs.

On the CDM side (for example, the log receiver/back up site 806, FIG. 8) one challenge may relate to how to start a resync operation. In some examples, a "resync-start" operation includes a synchronous long operation which can last a few minutes. Other operational time periods are possible. In some examples, this synchronous operation is made long enough to flush the entire in-memory buffer into a TSJ file, finalize active logs and create a new resync log. Some examples also create a new sync log in advance so that convergence can occur quickly during a "resync-end". This is discussed further below.

Some examples seek to ensure that an entire converge process can be completed in milliseconds to avoid potential impact of blocking I/Os. Some examples include a resync-end as an asynchronous operation that will routinely return quickly. This operation is possible before the next sync log is pre-created (linked to the resync log) that can be returned immediately. Note that creating a new log (TSJ file) may take a few seconds, which may be unacceptable if this is done in a critical data path that will block IOs. Since this is an asynchronous operation, some examples finalize the resync log and start receiving new sync logs in parallel.

Without resync capability, a log chain structure may be simple and consistent in a log store. An unintended consequence of introducing resync capability is that a log chain may contain different log types as a resync log does not have meaningful timestamps. This difference in log types may present problems for log replay and recoverable range computation. This issue may be addressed through the application of appropriate dummy time stamps.

Some examples are configured to handle "races" between a disk open or close (for example, triggered by snapshot, vMotion, and so forth) and a resync start or end. A resync operation can happen at any time. For example, it may occur just before, just after, or during a snapshot. Some examples are therefore configured to handle all occurrences properly to make sure the system is maintained in a consistent state.

Some instances of failures that can be covered by CDP resync may include a buffer overflow. A buffer overflow may occur in caches 720 and 722 in FIG. 7, for example. A buffer overflow in an I/O filter may occur due to intermittent network errors and I/O bursts. A buffer overflow may occur in an LRS due to SDFS throughput dips (for example the SDFS discussed above with reference to FIG. 8, or I/O bursts.

Figure 32:
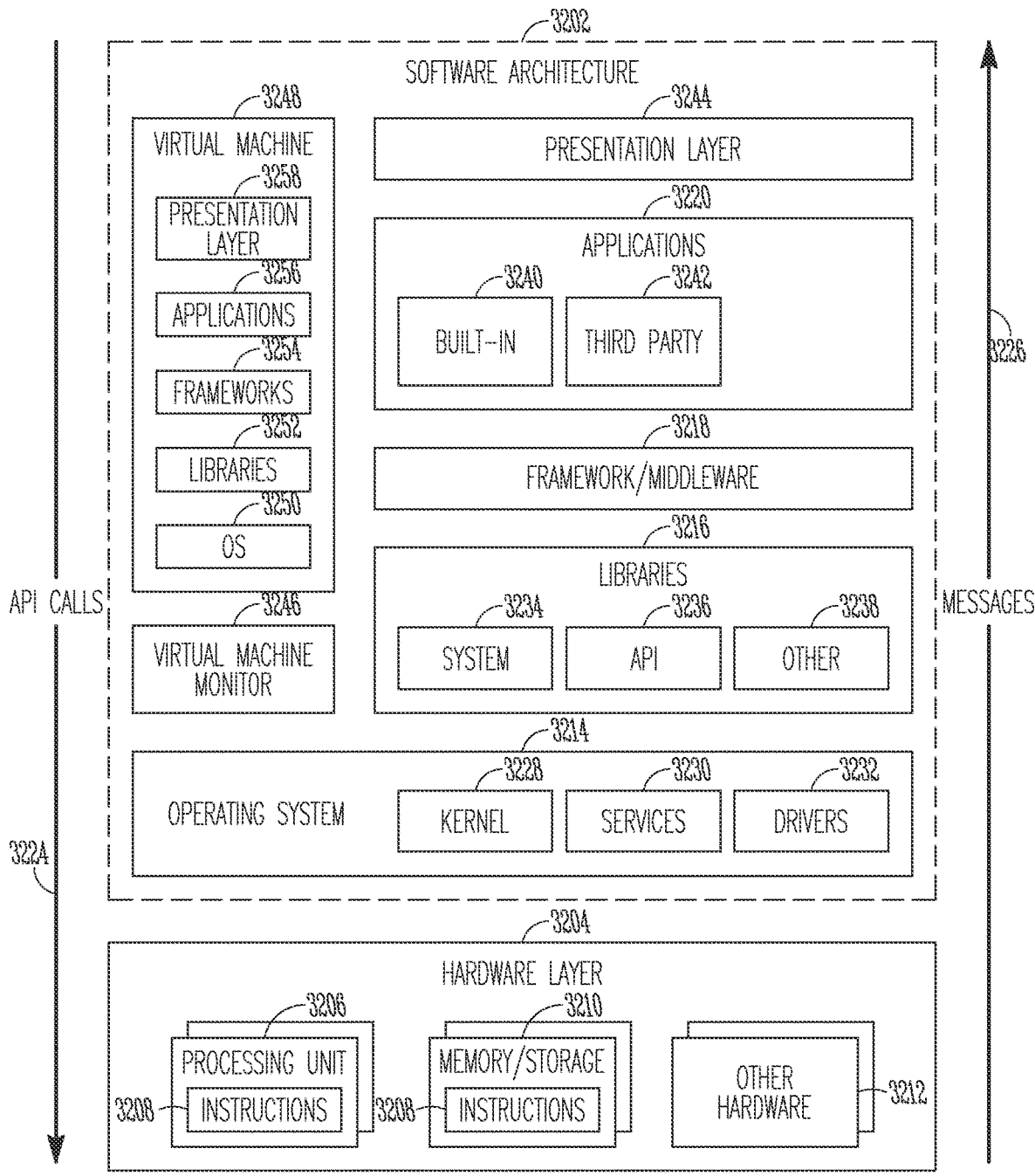
FIG. 32 depicts a block diagram illustrating an example of a software architecture that may be installed on a machine, according to some example embodiments.

FIG. 32 is a block diagram illustrating an example of a software architecture that may be installed on a machine, according to some example embodiments. FIG. 32 is merely a non-limiting example of a software architecture, and it will be appreciated that many other architectures may be implemented to facilitate the functionality described herein. The software architecture 3202 may be executing on hardware such as a machine 3400 of FIG. 34 that includes, among other things, processors 3410, memory 3430, and I/O components 3450. A representative hardware layer 3204 is illustrated and can represent, for example, the machine 3400 of FIG. 34. The representative hardware layer 3204 comprises one or more processing units 3206 having associated executable instructions 3208. The executable instructions 3208 represent the executable instructions of the software architecture 3202, including implementation of the methods, modules, and so forth described herein. The hardware layer 3204 also includes memory or storage modules 3210, which also have the executable instructions 3208. The hardware layer 3204 may also comprise other hardware 3212, which represents any other hardware of the hardware layer 3204, such as the other hardware illustrated as part of the machine 3200.

In the example architecture of FIG. 32, the software architecture 3202 may be conceptualized as a stack of layers, where each layer provides particular functionality. For example, the software architecture 3202 may include layers such as an operating system 3214, libraries 3216, frameworks/middleware 3218, applications 3220, and a presentation layer 3244. Operationally, the applications 3220 or other components within the layers may invoke API calls 3224 through the software stack and receive a response, returned values, and so forth (illustrated as messages 3226) in response to the API calls 3224. The layers illustrated are representative in nature, and not all software architectures have all layers. For example, some mobile or special purpose operating systems may not provide a frameworks/middleware 3218 layer, while others may provide such a layer. Other software architectures may include additional or different layers.

The operating system 3214 may manage hardware resources and provide common services. The operating system 3214 may include, for example, a kernel 3228, services 3230, and drivers 3232. The kernel 3228 may act as an abstraction layer between the hardware and the other software layers. For example, the kernel 3228 may be responsible for memory management, processor management (e.g., scheduling), component management, networking, security settings, and so on. The services 3230 may provide other common services for the other software layers. The drivers 3232 may be responsible for controlling or interfacing with the underlying hardware. For instance, the drivers 3232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 3216 may provide a common infrastructure that may be utilized by the applications 3220 and/or other components and/or layers. The libraries 3216 typically provide functionality that allows other software modules to perform tasks in an easier fashion than by interfacing directly with the underlying operating system 3214 functionality (e.g., kernel 3228, services 3230, or drivers 3232). The libraries 3216 may include system libraries 3234 (e.g., C standard library) that may provide functions such as memory allocation functions, string manipulation functions, mathematic functions, and the like. In addition, the libraries 3216 may include API libraries 3236 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 3216 may also include a wide variety of other libraries 3238 to provide many other APIs to the applications 3220 and other software components/modules.

The frameworks 3218 (also sometimes referred to as middleware) may provide a higher-level common infrastructure that may be utilized by the applications 3220 or other software components/modules. For example, the frameworks 3218 may provide various graphic user interface (GUI) functions, high-level resource management, high-level location services, and so forth. The frameworks 3218 may provide a broad spectrum of other APIs that may be utilized by the applications 3220 and/or other software components/modules, some of which may be specific to a particular operating system or platform.

The applications 3220 include built-in applications 3240 and/or third-party applications 3242. Examples of representative built-in applications 3240 may include, but are not limited to, a home application, a contacts application, a browser application, a book reader application, a location application, a media application, a messaging application, or a game application.

The third-party applications 3242 may include any of the built-in applications 3240, as well as a broad assortment of other applications. In a specific example, the third-party applications 3242 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 3242 may invoke the API calls 3224 provided by the mobile operating system such as the operating system 3214 to facilitate functionality described herein.

The applications 3220 may utilize built-in operating system functions (e.g., kernel 3228, services 3230, or drivers 3232), libraries (e.g., system 3234, APIs 3236, and other libraries 3238), or frameworks/middleware 3218 to create user interfaces to interact with users of the system. Alternatively, or additionally, in some systems, interactions with a user may occur through a presentation layer, such as the presentation layer 3244. In these systems, the application/module "logic" can be separated from the aspects of the application/module that interact with the user.

Some software architectures utilize virtual machines. In the example of FIG. 32, this is illustrated by a virtual machine 3248. A virtual machine creates a software environment where applications/modules can execute as if they were executing on a hardware machine e.g., the machine 3400 of FIG. 34, for example). A virtual machine 3248 is hosted by a host operating system (e.g., operating system 3214) and typically, although not always, has a virtual machine monitor 3246, which manages the operation of the virtual machine 3248 as well as the interface with the host operating system (e.g., operating system 3214). A software architecture executes within the virtual machine 3248, such as an operating system 3250, libraries 3252, frameworks/middleware 3254, applications 3256, or a presentation layer 3258. These layers of software architecture executing within the virtual machine 3248 can be the same as corresponding layers previously described or may be different.

Figure 33:
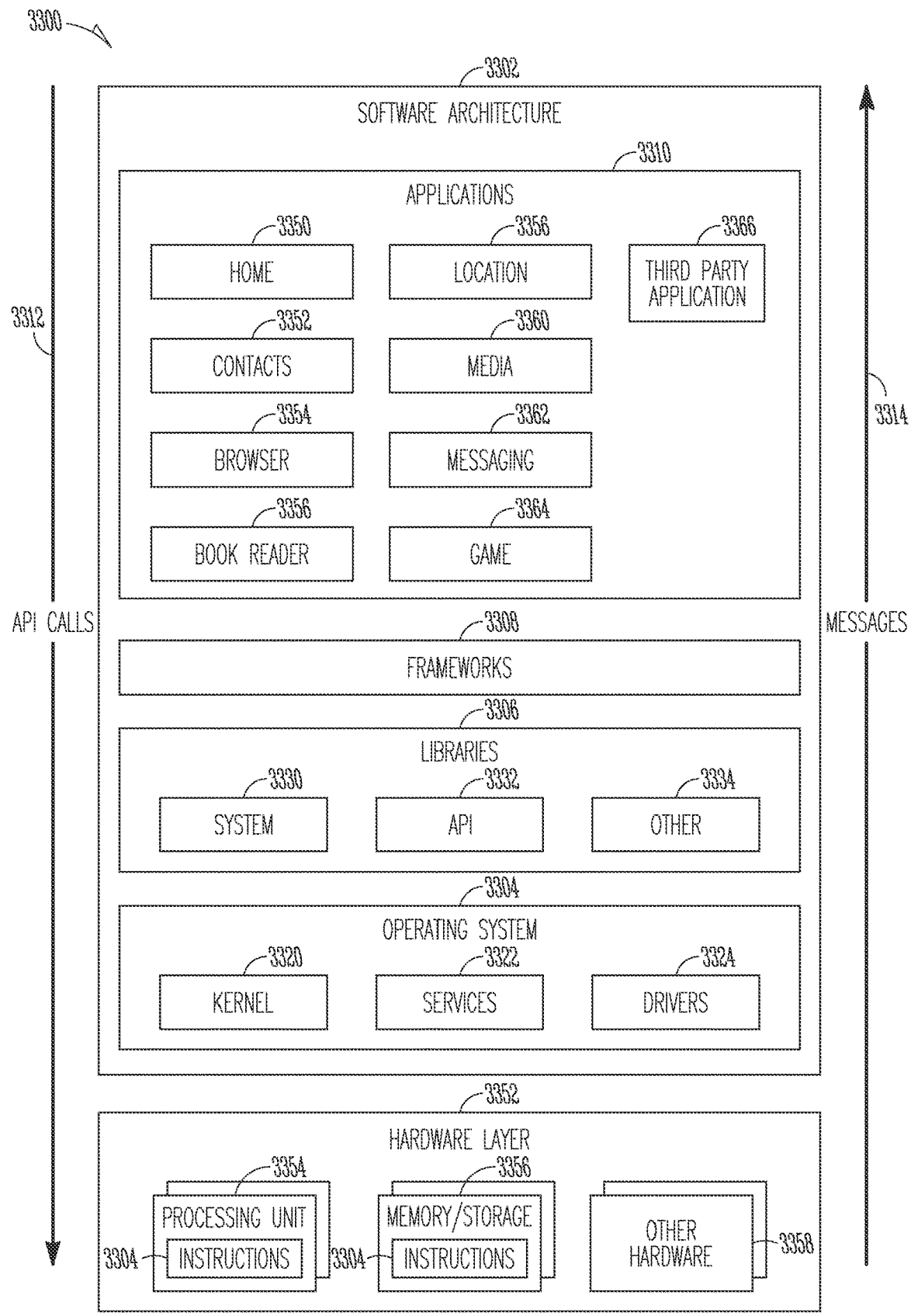
FIG. 33 depicts a block diagram illustrating an architecture of software, according to an example embodiment.

FIG. 33 is a block diagram 3300 illustrating an architecture of software 3302, which can be installed on any one or more of the devices described above. FIG. 33 is merely a non-limiting example of a software architecture, and it will be appreciated that many other architectures can be implemented to facilitate the functionality described herein. In various embodiments, the software 3302 is implemented by hardware such as a machine 3400 of FIG. 34 that includes processors 3410, memory 3430, and I/O components 3450. In this example architecture, the software 3302 can be conceptualized as a stack of layers where each layer may provide a particular functionality. For example, the software 3302 includes layers such as an operating system 3304, libraries 3306, frameworks 3308, and applications 3310. Operationally, the applications 3310 invoke application programming interface (API) calls 3312 through the software stack and receive messages 3314 in response to the API calls 3312, consistent with some embodiments.

In various implementations, the operating system 3304 manages hardware resources and provides common services. The operating system 3304 includes, for example, a kernel 3320, services 3322, and drivers 3324. The kernel 3320 acts as an abstraction layer between the hardware and the other software layers, consistent with some embodiments. For example, the kernel 3320 provides memory management, processor management (e.g., scheduling), component management, networking, and security settings, among other functionality. The services 3322 can provide other common services for the other software layers. The drivers 3324 are responsible for controlling or interfacing with the underlying hardware, according to some embodiments. For instance, the drivers 3324 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 3306 provide a low-level common infrastructure utilized by the applications 3310. The libraries 3306 can include system libraries 3330 (e.g., C standard library) that can provide functions such as memory allocation functions, string manipulation functions, mathematic functions, and the like. In addition, the libraries 3306 can include API libraries 3332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 3306 can also include a wide variety of other libraries 3334 to provide many other APIs to the applications 3310.

The frameworks 3308 provide a high-level common infrastructure that can be utilized by the applications 3310, according to some embodiments. For example, the frameworks 3308 provide various graphic user interface (GUI) functions, high-level resource management, high-level location services, and so forth. The frameworks 3308 can provide a broad spectrum of other APIs that can be utilized by the applications 3310, some of which may be specific to a particular operating system or platform.

In an example embodiment, the applications 3310 include a home application 3350, a contacts application 3352, a browser application 3354, a book reader application 3356, a location application 3358, a media application 3360, a messaging application 3362, a game application 3364, and a broad assortment of other applications such as a third-party application 3366. According to some embodiments, the applications 3310 are programs that execute functions defined in the programs. Various programming languages can be employed to create one or more of the applications 3310, structured in a variety of manners, such as object-oriented programming languages (e.g., Objective-C, Java, or C++) or procedural programming languages (e.g., C or assembly language). In a specific example, the third-party application 3366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 3366 can invoke the API calls 3312 provided by the operating system 3304 to facilitate functionality described herein.

Figure 34:
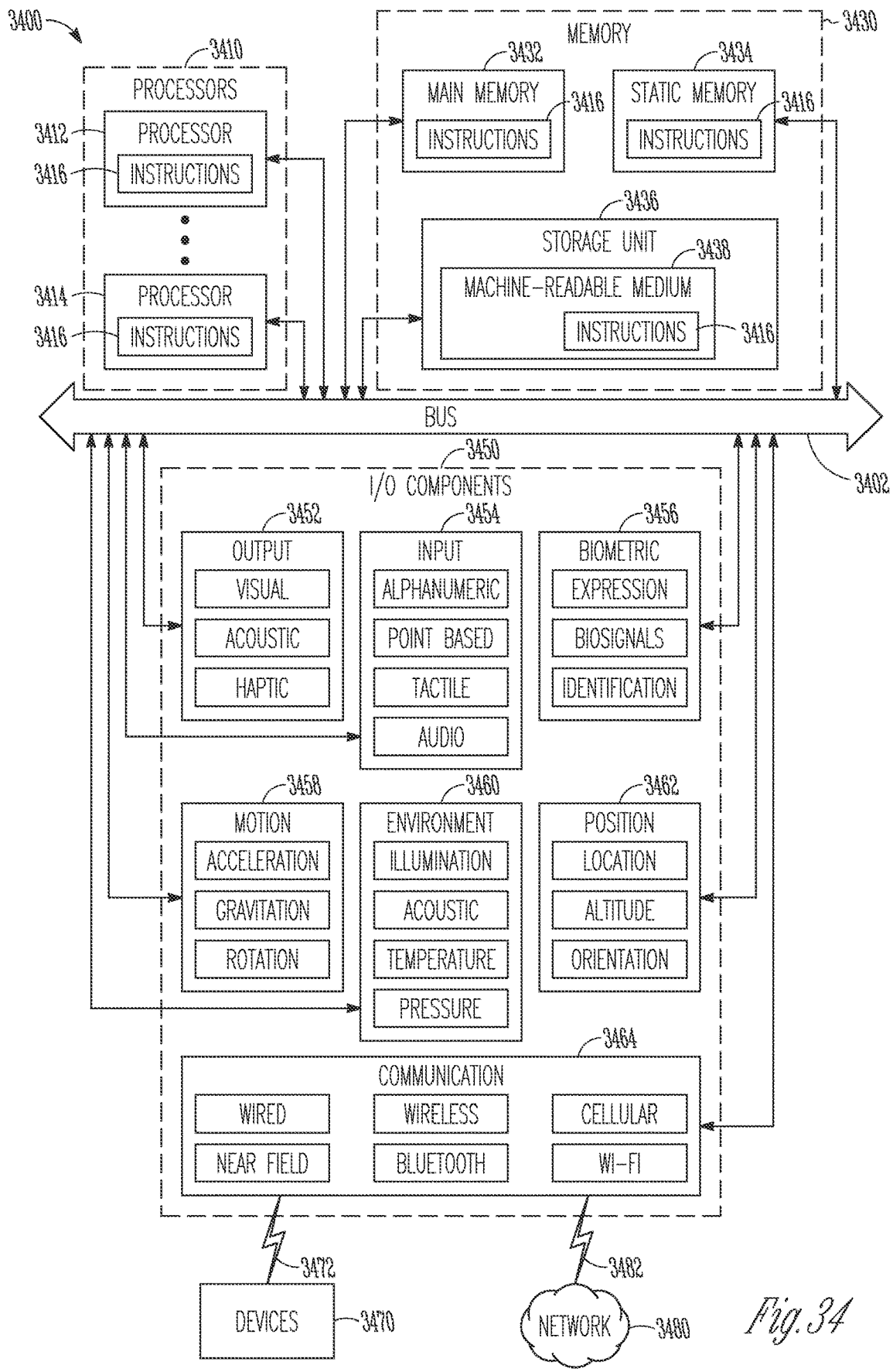
FIG. 34 illustrates a diagrammatic representation of a machine in the form of a computer system within which a set of instructions may be executed for causing a machine to perform any one or more of the methodologies discussed herein, according to an example embodiment.

FIG. 34 illustrates a diagrammatic representation of a machine 3400 in the form of a computer system within which a set of instructions may be executed for causing the machine to perform any one or more of the methodologies discussed herein, according to an example embodiment. Specifically, FIG. 34 shows a diagrammatic representation of the machine 3400 in the example form of a computer system, within which instructions 3416 (e.g., software, a program, an application, an applet, an app, or other executable code) for causing the machine 3400 to perform any one or more of the methodologies discussed herein may be executed. Additionally, or alternatively, the instructions 3416 may implement the operations of the methods shown in FIGS. 13-18, or as elsewhere described herein. The instructions 3416 transform the general, non-programmed machine 3400 into a particular machine 3400 programmed to carry out the described and illustrated functions in the manner described. In alternative embodiments, the machine 3400 operates as a standalone device or may be coupled (e.g., networked) to other machines. In a networked deployment, the machine 3400 may operate in the capacity of a server machine or a client machine in a server-client network environment, or as a peer machine in a peer-to-peer (or distributed) network environment. The machine 3400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 3416, sequentially or otherwise, that specify actions to be taken by the machine 3400. Further, while only a single machine 3400 is illustrated, the term "machine" shall also be taken to include a collection of machines 3400 that individually or jointly execute the instructions 3416 to perform any one or more of the methodologies discussed herein.

The machine 3400 may include processors 3410, memory 3430, and I/O components 3450, which may be configured to communicate with each other such as via a bus 3402. In an example embodiment, the processors 3410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 3412 and a processor 3414 that may execute the instructions 3416. The term "processor" is intended to include multi-core processors that may comprise two or more independent processors (sometimes referred to as "cores") that may execute instructions contemporaneously. Although FIG. 34 shows multiple processors 3410, the machine 3400 may include a single processor with a single core, a single processor with multiple cores (e.g., a multi-core processor), multiple processors with a single core, multiple processors with multiples cores, or any combination thereof.

The memory 3430 may include a main memory 3432, a static memory 3434, and a storage unit 3436, both accessible to the processors 3410 such as via the bus 3402. The main memory 3430, the static memory 3434, and storage unit 3436 store the instructions 3416 embodying any one or more of the methodologies or functions described herein. The instructions 3416 may also reside, completely or partially, within the main memory 3432, within the static memory 3434, within the storage unit 3436, within at least one of the processors 3410 (e.g., within the processor's cache memory), or any suitable combination thereof, during execution thereof by the machine 3400.

The I/O components 3450 may include a wide variety of components to receive input, provide output, produce output, transmit information, exchange information, capture measurements, and so on. The specific I/O components 3450 that are included in a particular machine will depend on the type of machine. For example, portable machines such as mobile phones will likely include a touch input device or other such input mechanisms, while a headless server machine will likely not include such a touch input device. It will be appreciated that the I/O components 3450 may include many other components that are not shown in FIG. 34. The I/O components 3450 are grouped according to functionality merely for simplifying the following discussion and the grouping is in no way limiting. In various example embodiments, the I/O components 3450 may include output components 3452 and input components 3454. The output components 3452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 3454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 3450 may include biometric components 3456, motion components 3458, environmental components 3460, or position components 3462, among a wide array of other components. For example, the biometric components 3456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 3458 may include acceleration sensor components (e.g., accelerometer), gravitation sensor components, rotation sensor components (e.g., gyroscope), and so forth. The environmental components 3460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 3462 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 3450 may include communication components 3464 operable to couple the machine 3400 to a network 3480 or devices 3470 via a coupling 3482 and a coupling 3472, respectively. For example, the communication components 3464 may include a network interface component or another suitable device to interface with the network 3480. In further examples, the communication components 3464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 3470 may be another machine or any of a wide variety of peripheral devices (e.g., a peripheral device coupled via a USB).

Moreover, the communication components 3464 may detect identifiers or include components operable to detect identifiers. For example, the communication components 3464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 3464, such as location via Internet Protocol (IP) geolocation, location via Wi-Fi® signal triangulation, location via detecting an NFC beacon signal that may indicate a particular location, and so forth.

The various memories (i.e., 3430, 3432, 3434, and/or memory of the processor(s) 3410) and/or storage unit 3436 may store one or more sets of instructions and data structures (e.g., software) embodying or utilized by any one or more of the methodologies or functions described herein. These instructions (e.g., the instructions 3416), when executed by processor(s) 3410, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 3480 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 3480 or a portion of the network 3480 may include a wireless or cellular network, and the coupling 3482 may be a Code Division Multiple Access (CDMA) connection, a Global System for Mobile communications (GSM) connection, or another type of cellular or wireless coupling. In this example, the coupling 3482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 3416 may be transmitted or received over the network 3480 using a transmission medium via a network interface device (e.g., a network interface component included in the communication components 3464) and utilizing any one of a number of well-known transfer protocols (e.g., hypertext transfer protocol (HTTP)). Similarly, the instructions 3416 may be transmitted or received using a transmission medium via the coupling 3472 (e.g., a peer-to-peer coupling) to the devices 3470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 3416 for execution by the machine 3400, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method, comprising:
   obtaining a snapshot of a computing object;
   intercepting, from an input/output (I/O) path, an I/O stream for the computing object;
   forming a recoverable log chain based at least in part on applying a replicated I/O stream to the snapshot, the replicated I/O stream based at least in part on the intercepted I/O stream; and
   based at least in part on a condition of the intercepted I/O stream or the replicated I/O stream:
   filtering the intercepted I/O stream to identify changed data blocks, and using the changed data blocks to resynchronize the recoverable log chain with a state of the computing object.

2. The method of claim 1, further comprising:
maintaining at least one bitmap corresponding to a plurality of data blocks of the computing object; and
modifying, in response to a data block of the plurality of data blocks being changed, a corresponding bit within the at least one bitmap to indicate that the data block is changed.

3. The method of claim 1, wherein using the changed data blocks to resynchronize the recoverable log chain comprises:
transmitting data of the changed data blocks to a log receiver service for resynchronization of the recoverable log chain.

4. The method of claim 1, further comprising:
maintaining a first buffer that tracks modified data blocks of the computing object; and
maintaining a second buffer that reads modified data of the modified data blocks of the computing object and transmits the modified data to a log receiver service for resynchronization of the recoverable log chain.

5. The method of claim 1, wherein the snapshot and the recoverable log chain are stored using a backup system that is different from a host system for the computing object.

6. The method of claim 1, wherein the condition comprises an interruption or discontinuity associated with the I/O stream, an interruption or discontinuity associated with the replicated I/O stream, or both.

7. The method of claim 1, wherein the intercepted I/O stream is filtered to identify changed data blocks based at least in part on an I/O filter switching to a resynchronization mode from a synchronization mode.

8. The method of claim 1, wherein the computing object comprises a virtual disk.

9. An apparatus, comprising:
one or more memories storing processor-executable code; and
one or more processors coupled with the one or more memories and individually or collectively operable to execute the code to cause the apparatus to:
obtain a snapshot of a computing object;
intercept, from an input/output (I/O) path, an I/O stream for the computing object;
form a recoverable log chain based at least in part on applying a replicated I/O stream to the snapshot, the replicated I/O stream based at least in part on the intercepted I/O stream; and
based at least in part on a condition of the intercepted I/O stream or the replicated I/O stream:
filter the intercepted I/O stream to identify changed data blocks, and
use the changed data blocks to resynchronize the recoverable log chain with a state of the computing object.

10. The apparatus of claim 9, wherein the one or more processors are individually or collectively further operable to execute the code to cause the apparatus to:
maintain at least one bitmap corresponding to a plurality of data blocks of the computing object; and
modify, in response to a data block of the plurality of data blocks being changed, a corresponding bit within the at least one bitmap to indicate that the data block is changed.

11. The apparatus of claim 9, wherein, to use the changed data blocks to resynchronize the recoverable log chain, the one or more processors are individually or collectively operable to execute the code to cause the apparatus to:
transmit data of the changed data blocks to a log receiver service for resynchronization of the recoverable log chain.

12. The apparatus of claim 9, wherein the one or more processors are individually or collectively further operable to execute the code to cause the apparatus to:
maintain a first buffer that tracks modified data blocks of the computing object; and
maintain a second buffer that reads modified data of the modified data blocks of the computing object and transmits the modified data to a log receiver service for resynchronization of the recoverable log chain.

13. The apparatus of claim 9, wherein the one or more processors are individually or collectively operable to execute the code to cause the apparatus to store the snapshot and the recoverable log chain using a backup system that is different from a host system for the computing object.

14. The apparatus of claim 9, wherein the condition comprises an interruption or discontinuity associated with the I/O stream, an interruption or discontinuity associated with the replicated I/O stream, or both.

15. The apparatus of claim 9, wherein the one or more processors are individually or collectively operable to execute the code to cause the apparatus to filter the intercepted I/O stream to identify changed data blocks based at least in part on an I/O filter switching to a resynchronization mode from a synchronization mode.

16. A non-transitory computer-readable medium storing code, the code comprising instructions executable by one or more processors to:
obtain a snapshot of a computing object;
intercept, from an input/output (I/O) path, an I/O stream for the computing object;
form a recoverable log chain based at least in part on applying a replicated I/O stream to the snapshot, the replicated I/O stream based at least in part on the intercepted I/O stream; and
based at least in part on a condition of the intercepted I/O stream or the replicated I/O stream:
filter the intercepted I/O stream to identify changed data blocks, and
use the changed data blocks to resynchronize the recoverable log chain with a state of the computing object.

17. The non-transitory computer-readable medium of claim 16, wherein the instructions are further executable by the one or more processors to:
maintain at least one bitmap corresponding to a plurality of data blocks of the computing object; and
modify, in response to a data block of the plurality of data blocks being changed, a corresponding bit within the at least one bitmap to indicate that the data block is changed.

18. The non-transitory computer-readable medium of claim 16, wherein the instructions to use the changed data blocks to resynchronize the recoverable log chain are executable by the one or more processors to:
transmit data of the changed data blocks to a log receiver service for resynchronization of the recoverable log chain.

19. The non-transitory computer-readable medium of claim 16, wherein the instructions are further executable by the one or more processors to:
maintain a first buffer that tracks modified data blocks of the computing object; and
maintain a second buffer that reads modified data of the modified data blocks of the computing object and transmits the modified data to a log receiver service for resynchronization of the recoverable log chain.

20. The non-transitory computer-readable medium of claim 16, wherein the condition comprises an interruption or discontinuity associated with the I/O stream, an interruption or discontinuity associated with the replicated I/O stream, or both.

* * * * *